United States Patent
Schushan

(10) Patent No.: US 10,257,709 B2
(45) Date of Patent: *Apr. 9, 2019

(54) BYPASSING SECURITY AUTHENTICATION SCHEME ON A LOST DEVICE TO RETURN THE DEVICE TO THE OWNER

(71) Applicant: Apple Inc., Cupertino, CA (US)

(72) Inventor: Asaf Schushan, Ramat Hasharon (IL)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/681,318

(22) Filed: Aug. 18, 2017

(65) Prior Publication Data

US 2018/0063717 A1 Mar. 1, 2018

Related U.S. Application Data

(63) Continuation of application No. 13/739,253, filed on Jan. 11, 2013, now Pat. No. 9,763,098.

(51) Int. Cl.
*H04W 12/12* (2009.01)
*H04W 4/22* (2009.01)
*H04W 12/02* (2009.01)

(52) U.S. Cl.
CPC .................. *H04W 12/12* (2013.01)

(58) Field of Classification Search
CPC ... G06F 21/31; H04M 1/673; H04M 1/27455; H04W 4/22; H04W 12/06; H04W 12/08; H04W 12/02
USPC ...... 455/410, 411, 456.1, 456.3, 565; 726/4, 726/17
See application file for complete search history.

(56) References Cited

U.S. PATENT DOCUMENTS

| | | |
|---|---|---|
| 5,933,080 A | 8/1999 | Nojima |
| 6,574,484 B1 | 6/2003 | Carley |
| 6,662,023 B1 | 12/2003 | Helle |
| 6,714,222 B1 | 3/2004 | Bjorn et al. |
| 6,771,954 B1 | 8/2004 | Yoneyama et al. |
| 7,039,628 B2 | 5/2006 | Logan, Jr. |
| 7,293,122 B1 | 11/2007 | Schubert et al. |
| 7,466,235 B1 | 12/2008 | Kolb et al. |
| 8,229,392 B2 | 7/2012 | Bumiller et al. |
| 8,248,237 B2 | 8/2012 | Fitzgerald et al. |
| 8,521,122 B2 | 8/2013 | Scott et al. |
| 8,543,081 B2 | 9/2013 | Scott et al. |
| 8,606,314 B2 | 12/2013 | Barnes, Jr. |
| 8,910,299 B2 * | 12/2014 | Michalske ............. G06F 21/31 726/16 |
| 9,311,498 B2 | 4/2016 | Michalske |
| 2002/0104005 A1 | 8/2002 | Yin et al. |
| 2003/0012344 A1 | 1/2003 | Agarwal et al. |
| 2004/0063423 A1 * | 4/2004 | Kagay, Jr. ............. H04W 88/02 455/410 |
| 2004/0078231 A1 | 4/2004 | Wilkes et al. |
| 2004/0092248 A1 | 5/2004 | Kelkar et al. |

(Continued)

*Primary Examiner* — Julio R Perez
(74) *Attorney, Agent, or Firm* — Morgan, Lewis & Bockus LLP

(57) ABSTRACT

Some embodiments provide a method for bypassing device security protections to communicate with a contact of a secure device. The method displays a selectable user interface object on the device enabling a user to bypass the security protections of the device. Upon receiving a selection of the user interface object, the method initiates a communication to a contact that is preselected from a list of contacts.

20 Claims, 24 Drawing Sheets

(56) References Cited

U.S. PATENT DOCUMENTS

| | | |
|---|---|---|
| 2004/0203576 A1 | 10/2004 | Droste et al. |
| 2004/0233930 A1 | 11/2004 | Colby |
| 2005/0044333 A1 | 2/2005 | Browning |
| 2005/0085215 A1 | 4/2005 | Kokko et al. |
| 2005/0086073 A1 | 4/2005 | Rodes et al. |
| 2005/0122315 A1 | 6/2005 | Chalk et al. |
| 2005/0151642 A1 | 7/2005 | Tupler et al. |
| 2005/0157853 A1 | 7/2005 | Andrew |
| 2005/0223062 A1 | 10/2005 | Doan et al. |
| 2005/0240613 A1 | 10/2005 | Logan |
| 2006/0077903 A1 | 4/2006 | Hiltunen |
| 2006/0258389 A1 | 11/2006 | Saito et al. |
| 2007/0135043 A1* | 6/2007 | Hayes .................. H04M 1/67 455/26.1 |
| 2007/0158411 A1 | 7/2007 | Krieg |
| 2008/0077431 A1 | 3/2008 | Calder et al. |
| 2008/0319799 A1 | 12/2008 | Knowlton |
| 2009/0205041 A1 | 8/2009 | Michalske |
| 2010/0115092 A1 | 5/2010 | Westin |
| 2011/0088003 A1 | 4/2011 | Swink et al. |
| 2014/0026192 A1 | 1/2014 | Gatewood et al. |
| 2015/0052618 A1 | 2/2015 | Michalske |
| 2016/0202877 A1 | 7/2016 | Michalske |

\* cited by examiner

BYPASSING SECURITY AUTHENTICATION SCHEME ON A LOST DEVICE TO RETURN THE DEVICE TO THE OWNER

CLAIM OF BENEFIT TO PRIOR APPLICATION

This Application is a continuation application of U.S. patent application Ser. No. 13/739,253, filed Jan. 11, 2013, now published as U.S. Patent Publication No. 2014/0199966. U.S. Patent Publication No. 2014/0199966 is incorporated herein by reference.

BACKGROUND

The majority of handheld devices (e.g., laptops, tablet devices, smartphones, multi-media players/devices) available today provide mechanisms for securing the handheld device so that only the device owner or those authorized by the owner can access data on the device. It is common practice for handheld device owners to employ such security mechanisms to protect their devices as well as the integrity of the data on these devices.

When an honest finder locates a lost device, his methods of getting the device back to its owner include placing a phone call to any contact stored on the device. However, when the device has a security authentication scheme enabled, an honest finder has no way of providing the device with the correct authentication credentials. In such cases, the honest finder is limited to either waiting for the device to receive a phone call from the owner or someone close to the owner who can help identify the device's owner. Or, if the device was found left in a public establishment (e.g., a restaurant, a shop, a taxi etc.), the honest finder can leave the device with an employee of the establishment. However, this mechanism only works if the device owner returns to the correct establishment and the employee is honest enough to return the device. Nevertheless, it is very difficult or impossible for an honest finder of a lost device with a security authentication scheme enabled to proactively attempt to locate the owner of the device to facilitate returning the device to its owner.

BRIEF SUMMARY

Some embodiments of the invention provide a secured device that allows a user to initiate a communication with a particular contact stored in the device by bypassing the device's security scheme. The security scheme of the device prevents an unauthenticated user from using the device to initiate a communication. By allowing an unauthenticated user to communicate with the particular contact using the device, the device enables an honest finder to contact the particular contact even if the device is secured, in case the owner of the device loses the device. Also, the device allows the owner to initiate a communication with the particular contact quicker because the owner does not have to go through the device's security scheme to get authenticated by the device to use the device.

In some embodiments, the device provides a selectable user interface (UI) item, which when selected causes the device to bypass the security scheme and initiate a communication with a preselected contact stored on the device. Instead of initiating a communication with a preselected contact, the device of some embodiments provides a set of contacts when the device receives a selection of the selectable UI item. The device allows an unauthenticated user to choose a contact from the set of contacts and initiate a communication with a selected contact.

The device of some embodiments provides several different communication types that an unauthenticated user can use to initiate a communication with a selected contact. In some embodiments, these communication types include a phone call, a short messaging service (SMS) message, an email, a video conference, etc. These communication types are supported by applications running on the device. In some embodiments, these applications include applications that are provided by the manufacturer of the device as well as applications that are provided by third-party vendors.

In some embodiments, the device also provides an authenticated user (e.g., the owner of the device) with the option to set up or select a set of contacts to which an unauthenticated user can initiate communications when the device's security scheme is bypassed. For each of such contacts, the device of some embodiments allows the authenticated user to set up or select a set of communication types that may be used to initiate a communication with the contact. Moreover, the device of some embodiments allows the authenticated user to impose a limit on the amount of activity (e.g., number of phone calls, amount of outgoing data, etc.) that an unauthenticated user can initiate using the device when the device's security scheme is bypassed.

The device in some embodiments connects to a network through a routing device to initiate a communication with a contact when the device's security scheme is bypassed. Often, a routing device requires the device to be authenticated in order to use the routing device to connect to the network. In some embodiments, a routing device allows the device to get by the authentication requirement such that the device can connect to the network and send a communication, which is initiated when the device's security scheme is bypassed, through the network.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF THE FIGURES

The novel features of the invention are set forth in the appended claims. However, for purpose of explanation, several embodiments of the invention are set forth in the following figures.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments of the invention provide a secured device that enables a user to initiate a communication with a pre-selected (or privileged) contact stored in the device by bypassing the device's security scheme. The security scheme of the device prevents an unauthenticated user from using the device to initiate a communication. By allowing an unauthenticated user to communicate with the particular contact using the device, the device enables an honest finder to contact the particular contact even if the device is secured, in case the owner of the device loses the device. Additionally, the device provides the user with an option to initiate a communication with a specific pre-selected contact quicker that is not subject to the security constraints of the other pre-selected contacts.

Figure 1:
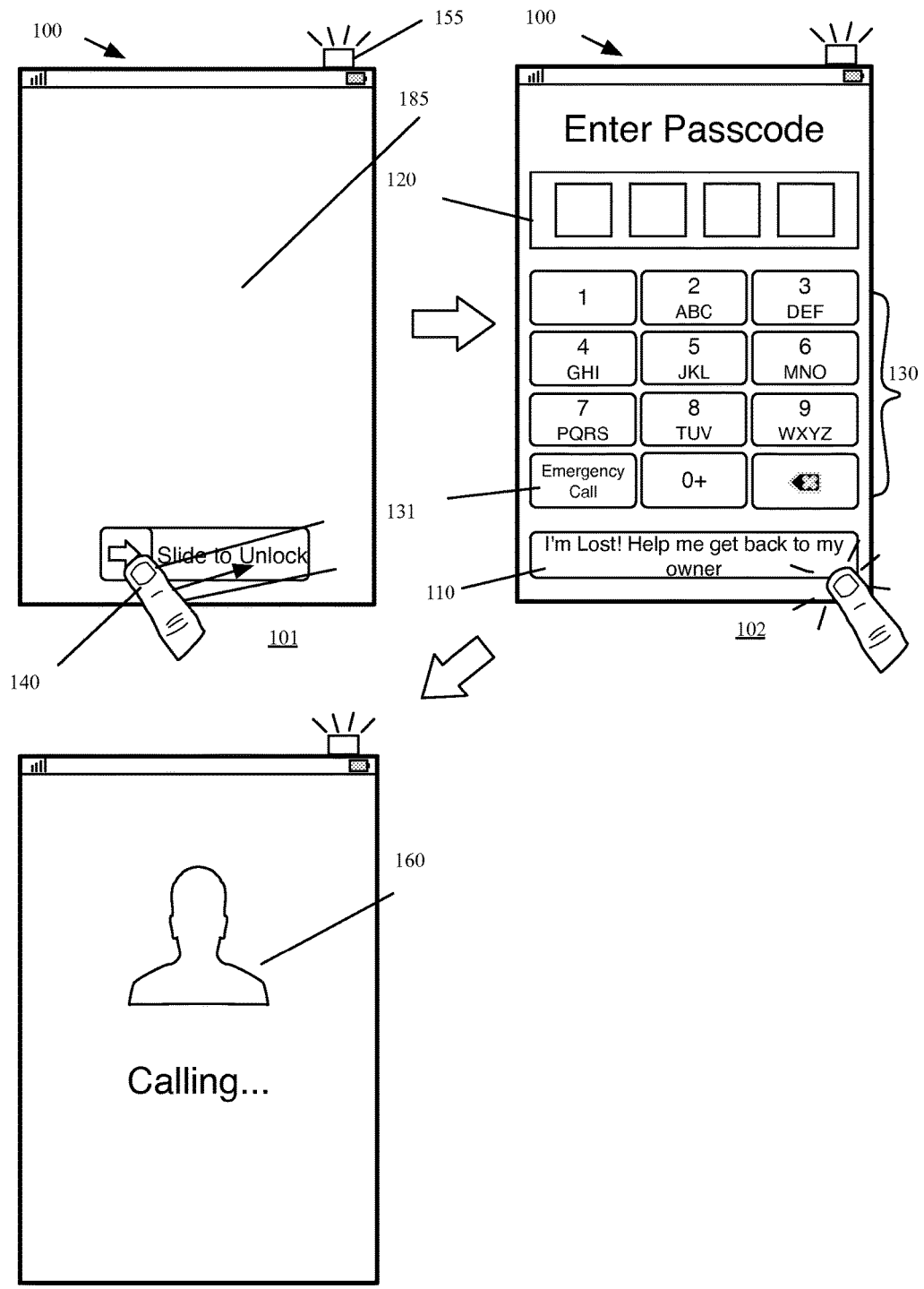
FIG. 1 illustrates an example of a device that initiates contact with a pre-selected contact of some embodiments.

FIG. 1 illustrates an example of a device that initiates contact with a pre-selected contact of some embodiments. Specifically, this figure illustrates in three stages 101-103 a user's interaction with a device 100. The device 100 includes a display area 185 for displaying a different set of UI items based on user interaction with the display area 185. In some embodiments, the device 100 provides a selectable UI item 110 for bypassing the security scheme of the device 100. The device 100 of some embodiments displays the selectable UI item 110 when a user is prompted to provide inputs, which the device 100 uses to authenticate the user. However, the user can select the selectable UI item 110 to initiate a communication with a contact stored on the device 100, without providing such inputs.

The device 100 in some embodiments is a communication device that is capable of initiating a communication with a contact stored in the device 100. Such a device may be a smartphone, a laptop computer, a tablet computer, a media player, etc. The device 100 includes a list of pre-selected contacts (not shown) with which the device can initiate communications. The list of pre-selected contacts are configured by the owner of the device.

The first stage 101 shows the device 100 when the device has not been used for a while. In some embodiments, the device 100 "locks" the screen or the display area 185 to prevent the device 100 from interpreting the user's interactions with the display area 185 as intended interactions. For instance, the device 100 does not change what is displayed in the display area 185 when the user touches display area 185 with a finger or a stylus while the display area is locked.

The device 100 does not "unlock" the screen until a set of certain predefined operations are performed on the display area 185 by the user. In this example, the device 100 displays in the display area 185 a selectable UI item 140 for unlocking the screen. In some embodiments, the selectable UI item 140 is for unlocking the device so that the device 100 starts interpreting user's interaction with the display area 185 as intended interactions. However, some embodiments bypass displaying UI item 140 in exchange for other means of unlocking the device. For instance, in some embodiments, depressing and releasing device button 155 unlocks the device. Such embodiments still display UI item 140 in display area 185 after releasing device button 155. Other such embodiments bypass displaying UI item 140 in display area 185 requiring no user interaction with display area 185 to unlock the device after releasing device button 155.

In this example, the selectable UI item 140 unlocks the device when the selectable UI item 140 receives a swipe gesture in a certain direction (e.g., left to right). One of the ordinary skill in the art will recognize that there are numerous other ways to "unlock" the display area 185 such as receiving a gestural interaction in any portion of display area 185.

The second stage 102 shows the device 100 after the display area 185 is unlocked. When the display area 185 is unlocked, the device 100 of some embodiments displays a set of UI items (e.g., a button, an icon, a dropdown menu, a text box) that implement the device's security scheme. In this example, the security scheme of the device 100 is requesting a correct passcode. Entering a correct passcode "un-secures" the device 100 to allow the user to use the device 100 freely. For instance, the user can dial any number or can make a phone call to any contact using the device 100 once unlocked.

In this example, the device displays a keypad 130 for receiving entry of the security passcode to unsecure the device. The keypad 130 of some embodiments includes selectable buttons for receiving alphanumeric character inputs. As the device 100 receives the alphanumeric characters through the keypad 130, the device displays in a set of boxes 120 either the received characters or visual indications (e.g., symbols) that a passcode is being received.

In some embodiments, the device 100 also provides a selectable UI item 131 for placing an emergency phone call. The device 100 of some embodiments is preconfigured (e.g., by the manufacturer of the device 100) to place a phone call to a local emergency dispatcher (e.g., a 911 dispatcher in the United States) of the current location the device 100 at the time of the phone call.

The second stage 102 also shows that the device is displaying the selectable UI item 110. When the device receives a selection of the selectable UI item 110, the device bypasses the device's security scheme and initiates a communication with a pre-selected contact stored in the device 100. In this example, selection of the selectable UI item 110 causes the device 100 to place a phone call to a pre-selected contact. As will be discussed further below, an authenticated user (e.g., a user that enters a correct passcode) can select or set up the contacts for the device 100 to initiate a communication with, when the selectable UI item 110 is selected.

The third stage 103 illustrates device 100 after receiving the selection of selectable UI item 110. As shown, the device 100 displays a visual indication 160 to indicate that the device is initiating a communication with the pre-selected contact. In this example, the visual indication 160 alerts the user that the device is attempting to place a phone call to the pre-selected contact. In some embodiments, the visual indication 160 provides contact information (e.g., a name and/or a phone number) of the contact so that a finder can use that information to initiate a communication (e.g., place a phone call) with the contact using a device other than the device 100. For instance, the finder may use the finder's own device (e.g., a phone) to call the particular contact.

Also, the owner of the device 100 (not shown) may use the selectable UI item 110 to quickly initiate a communication with the pre-selected contact. For example, the owner may designate a favorite contact (e.g., a spouse, a family member, a close friend, etc.) as the pre-selected contact and use the selectable UI item to make a phone call to the pre-selected contact without having to enter the passcode.

Figure 2:
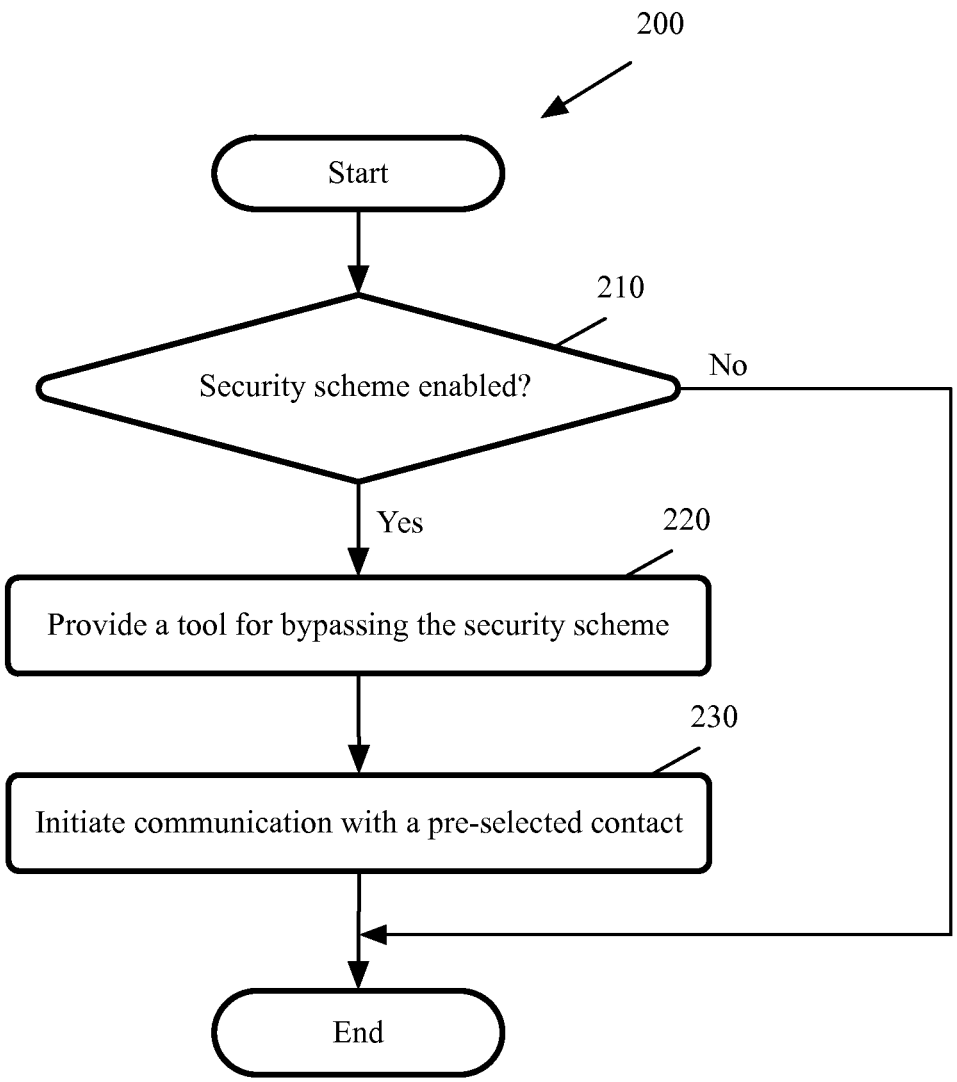
FIG. 2 conceptually illustrates a process that some embodiments perform to assist a user in initiating a communication with a pre-selected contact stored in a device without going through the security scheme of the device.

FIG. 2 conceptually illustrates a process 200 that some embodiments perform to assist a user in initiating a communication with a pre-selected contact stored in a device without going through the security scheme of the device. The process 200 in some embodiments is performed by a device that has a security scheme to prevent a user from using the device (e.g., initiating a communication with a stored contact, viewing the information about the contact, etc.) without getting authenticated by the device by going through the security scheme.

As shown, the process determines (at 210) whether a security scheme is enabled for the device. The devices of different embodiments have different security schemes. For instance, some embodiments requires the user to enter a passcode to get authenticated to use the device. Other embodiments may use a voice recognition technique to prevent users whose voices are different than the owner's voice from using the device. Other security schemes may utilize retina scan, face scan, fingerprint scan, etc., to authenticate the owner.

In some embodiments, the process 200 determines whether a security scheme is enabled, based on the configuration information for the device. In some embodiments, the device allows a user to configure the device to enable or disable the security scheme of the device as the user sees fits. In these embodiments, the configuration data would include information that indicates whether the security scheme for the device is enabled or disabled.

When the process 200 determines (at 210) that a security scheme is not enabled for the device or the security scheme is not available for the device, the process ends. When the process 200 determines (at 210) that a security authentication scheme is enabled for the device, the process provides (at 220) a bypassing tool to bypass the enabled security scheme for limited access to the device. In some embodiments, the bypass tool is in the form of a selectable UI item displayed in a display area of the device. Upon receiving a selection of the bypassing tool, the device initiates (at 230) communication with a preselected contact (e.g., the owner's family member, a close friend, etc.) via a preselected communication type (e.g., email, text message, phone call, video chat, etc.). The process then ends.

Additional embodiments of the invention are described in the sections below. Section I below describes the process and examples of initiating communication from a lost secured device by bypassing security schemes. Section II then describes establishing a connection with a routing device using by bypassing security schemes on a Wi-Fi enabled device. Section III then describes limited access connectivity mode for routing devices. Section VI then describes the configuration of privileged contacts. Section V then describes a device that has exceeded either call or data limitations. Section VI then describes an exemplary system architecture of a security bypass scheme. Section VII lastly describes electronic devices that employ such a security bypass scheme.

I. Initiating Communication from a Lost Secured Device to a Preselected Contact

Figure 3:
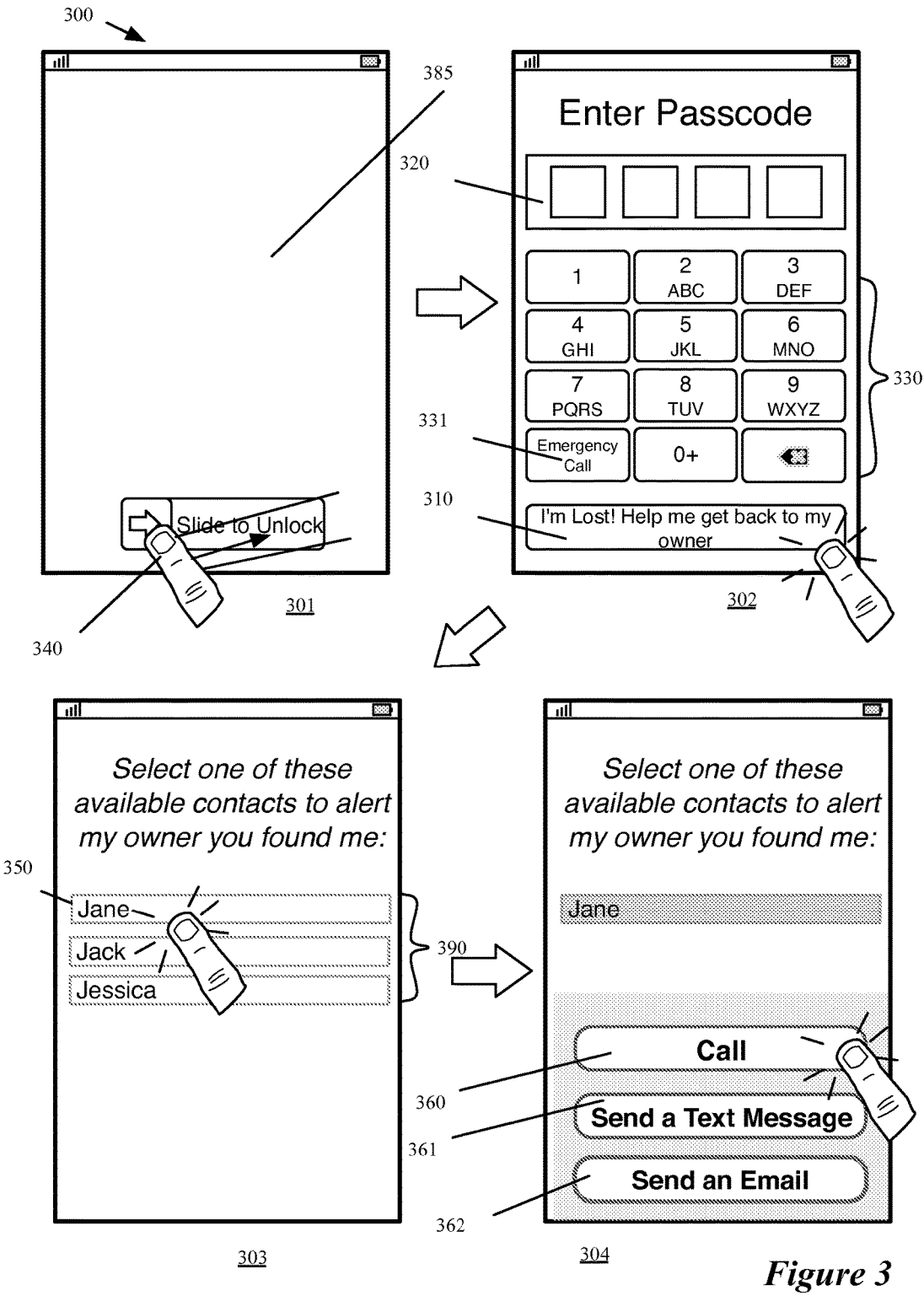
FIG. 3 illustrates an example of a device that allows a user to bypass security schemes of some embodiments to initiate communication with a contact from a pre-selected list of contacts.

FIG. 3 illustrates an example of a device 300 that allows a user to bypass security schemes of some embodiments to initiate communication with a contact from a pre-selected list of contacts. The figure illustrates a user's interaction with device 300 in four stages 301, 302, 303, and 304. Device 300 has similar features to that of device 100. However, the example illustrated by FIG. 3 illustrates additional options for user interaction.

The device 300 includes a display area 385 for displaying different sets of UI items based on user interaction with the display area 385. In some embodiments, the device 300 provides a selectable UI item 310 for bypassing the security scheme of the device 300 similar to UI item 110.

The first stage 301 shows the device 300 when the device has not been used for a while. In some embodiments, the device 300 "locks" the screen or the display area 385 to prevent the device 300 from interpreting the user's interactions with the display area 385 as intended interactions. The device 300 does not "unlock" the screen until a set of certain predefined operations are performed on the display area 385 by the user. In this example, the device 300 displays in the display area 385 a selectable UI item 340 for unlocking the screen so that the device 300 starts interpreting user's interaction with the display area 385 as intended interactions. The selectable UI item 340 in display area 385 unlocks the device when the selectable UI item 340 receives a swipe gesture in a certain direction (e.g., left to right). However, as described with respect to FIG. 1, some embodiments unlock the device after user interaction with a device button (not illustrated) such as button 155.

The second stage 302 shows the device 300 after the display area 385 is unlocked. When the display area 385 is unlocked, the device 300 of some embodiments displays a user interface with a set of UI items (e.g., a button, an icon, a dropdown menu, a text box) that implement the device's security scheme. In this example, the security scheme of the device 300 is requesting a correct passcode. Entering a correct passcode "un-secures" the device 300 to allow the user to use the device 300 freely. For instance, the user can make a phone call to any contact using the device 300 once the device 300 is unlocked.

Similar to the second stage, 102 of FIG. 1, in this example, the device displays a keypad 330 for receiving entry of the security passcode to unsecure the device. As the device 300 receives the alphanumeric characters through the keypad 330, the device displays in a set of boxes 320 either the received characters or visual indications (e.g., symbols) that a passcode is being received.

In some embodiments, the device 300 also provides a selectable UI item 331 for placing an emergency phone call. The device 300 of some embodiments is preconfigured (e.g., by the manufacturer of the device 300) to place a phone call to a local emergency dispatcher (e.g., a 911 dispatcher in the United States) of the current location the device 300 at the time of the phone call.

The second stage 302 also shows that the device is displaying the selectable UI item 310. When the device receives a selection of the selectable UI item 310, the device bypasses the device's security scheme and provides a set of contacts with which to initiate communication. The device could automatically initiate communication with a specific selected contact or, as illustrated in this example, provide the user with a set of preconfigured contacts to select. As will be discussed further below, an authenticated user (e.g., a user that enters a correct passcode) can select or set up any number of contacts for the device 300 to initiate a communication with, when the selectable UI item 310 is selected. However, in some embodiments, the device only provides contact information (e.g., a name and/or a phone number) of the particular contact in the displays area 385 so that a finder can use that information to initiate a communication (e.g., place a phone call) with the particular contact using a device other than the device 300.

The third stage 303 illustrates the device's display area after receiving a selection to bypass the device's security scheme. The third stage 303 differs from the third stage 103 of FIG. 1 in that it provides the user a set of selectable contacts 390 when the device's security scheme is bypassed. By bypassing the device's security scheme, the device provides the narrow accessibility of only initiating contact with the preselected contacts displayed in display area 385. The device disables all other functionality available to the user. For instance, functions such as running certain applications or accessing the device's complete contact list would be unavailable to the user. However, were the device to return to stage 302 and authenticate the user, then the device would enable all features until the device screen locks again.

The third stage 303 illustrates a selectable contact list 390, in display area 385. Selectable contact list 390 includes pre-selected contact 350. Pre-selected contact 350 is associated with a pre-selected contact or group of contacts stored on the device. In some embodiments, display area 385 displays any number of selectable contacts and/or the device's owner. In the third stage 303 the device receives a selection of contact 350.

The fourth stage 304 illustrates display area 385 after receiving the selection of a contact in order to initiate communication with the contact. In this case, selection of contact 350 of the previous stage causes the device to display a list of selectable communication types 360-362. The list is displayed, for example, as a set of buttons, icons, or dropdown menus. In this example, the selected contact is available for contact via a phone call, a text message, or an email. In this example, the device receives a selection of UI item 360 to call the selected contact. Although this is one example of available communication types for a particular contact, in some embodiments, the device displays different communication types associated with different contacts depending on how the device is configured. For instance, in some embodiments, the device only displays the phone call option, while in other embodiments, the device displays some combination of two of phone call, text message, and email. Other embodiments may not be limited to simply phone call, text message or email. In such embodiments, the device integrates with third party applications (e.g., video conference applications such as Facetime® and Skype®) to initiate contact. Device configuration is explained in more detail in section IV.

By receiving a selection of the call UI item, the device attempts to initiate a phone call with the selected contact 350 using the stored phone number associated with the contact. Some embodiments display the contact number in the device's display, while other embodiments keep this number private for security purposes. While the example illustrated in FIG. 3 shows the device displaying UI item 310 in the second stage 302, the device of some embodiments also displays UI item 310 in the first stage 301 or in both the first stage 301 and the second stage 302. Furthermore, the device of some embodiments provides an option to return from the third and fourth stages of this example to the first and/or second stage to authenticate the user.

Figure 4:
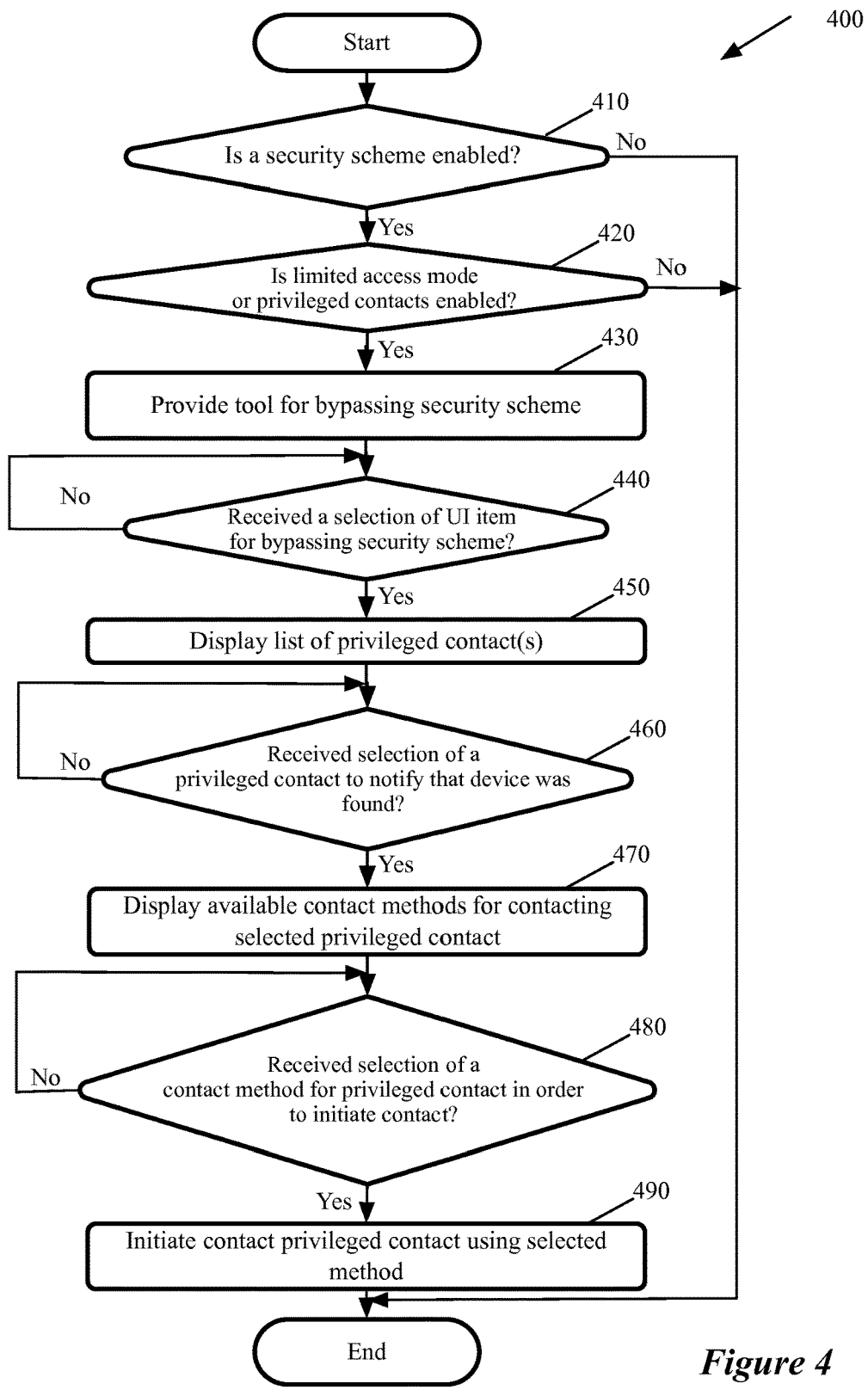
FIG. 4 conceptually illustrates a process 400 of some embodiments for bypassing a device's security scheme and initiating communication with a pre-selected contact.

FIG. 4 conceptually illustrates a process 400 of some embodiments for bypassing a device's security scheme and initiating communication with a pre-selected contact. In some embodiments, the process is performed by a handheld device using a security scheme. Process 400 of some embodiments starts when the process receives an input from a user to "unlock" the device screen. For instance, with reference to FIG. 3, the process starts after receiving a user interaction with UI item 340.

As shown, the process checks (at 410) whether a security scheme is enabled on the device. When a security scheme is not enabled, the process ends. When a security scheme is enabled, the process determines (at 420) whether the limited access mode for the device is enabled. In some embodiments, limited access mode is disabled by not enabling a particular setting or when the device does not have any stored contacts selected as privileged contacts. Therefore, the device cannot initiate any communication in limited access mode. When privileged contacts or limited access mode is not enabled on the device, the process ends.

Otherwise, the process provides (at 430) a tool (e.g., displays a UI item), which when selected causes the device to bypass the security scheme of the device. In some embodiments, the tool is similar to UI item 310 of FIG. 3. The process then determines (at 440) whether a selection of the UI item has been received. The process continues to check for a selection until one is received. Once a selection is received, the process displays (at 450) the list of privileged contacts on the device. The list of privileged contacts is any number of contacts preselected from the device's stored contact list designated as an available contact when the device's security scheme is bypassed. The device's owner is also optionally displayed as a privileged contact configured to initiate communication with the device's owner using alternative means such as email or an alternate phone such as a land line.

The process then determines (at 460) whether a selection of one of the privileged contacts is received. The process continues to check for a selection until one is received. Upon receiving a contact selection, the process displays (at 470) the available communication types for initiating contact with the selected privileged contact. In some embodiments, the device displays communication types that were preconfigured for the selected user on the device and/or a default list of communication types. Further, when only one communication type is preselected for the selected contact, some embodiments skip display of communication type options and automatically initiate communication with the selected contact.

The process determines (at 480) whether the interface has received a selection of a communication type for initiating communication with the selected contact. The process continues to check for the communication type selection until a selection is received. Upon receiving a selection of a communication type, the process initiates (at 490) contact with the selected contact using the selected communication type. The process then ends. In some embodiments, initiating contact requires the use of a third party application, such as a VoIP application, running on the device or the device itself initiates contact. When communication is initiated by a third party application the device coordinates authentication between the device and the third party application so that the third party application is available to initiate communication.

Figure 5:
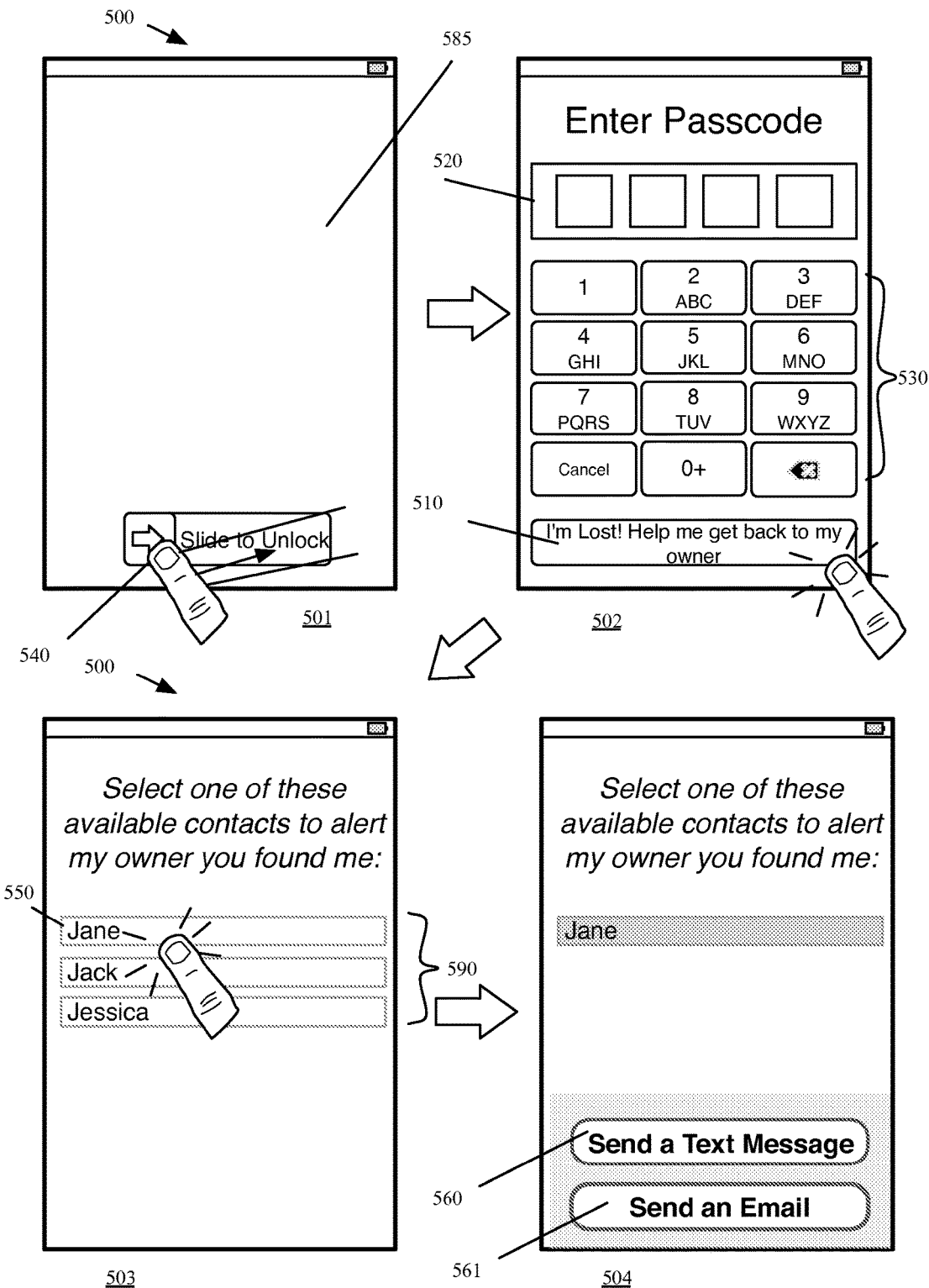
FIG. 5 illustrates an example of a Wi-Fi enabled device that allows a user to bypass security schemes to initiate communication with a pre-selected contact of some embodiments.

FIG. 5 illustrates an example of a Wi-Fi enabled device 500 that allows a user to bypass security schemes to initiate communication with a pre-selected contact of some embodiments. The device in this example either does not have cellular capability or a cellular connection is not available. This figure illustrates a user's interaction with the Wi-Fi enabled device 500 in four stages 501-504. FIG. 5 illustrates the commonalities with the user interfaces of a cellular device and a Wi-Fi enabled device. As is described below many of the UI features are similar to those described above in reference to FIG. 3. However, a Wi-Fi enabled device is limited operationally in that it requires a network (router) connection to initiate any communication.

Similar to device 300 described above, Wi-Fi enabled device 500 includes a display area 585 for displaying different sets of UI items based on user interaction with the display area 585. The Wi-Fi enabled device 500 of some embodiments is capable of initiating communication with a contact stored in the device using a network connection and in some instances third party applications or services. Such a device may be a personal digital assistant (PDA), a laptop computer, a tablet computer, a media player, etc. The Wi-Fi device 500 includes a list of contacts with which the device can initiate communications.

The first three stages 501-503 of FIG. 5 are similar to stages 301-303 of FIG. 3, respectively. For simplicity the analogous UI items of the four stages of FIG. 5 are only briefly described below since these features were already discussed in detail with respect to FIG. 3.

The first stage 501 illustrates receiving a user interaction of a swipe gesture on UI item 540 (similar to UI item 340) in display area 585 (similar to 385) to "unlock" the Wi-Fi enabled device 500. The second stage 502 shows the Wi-Fi enabled device 500 after the display area 585 is unlocked. Similar to FIG. 3, the device displays a keypad 530. However, unlike the keypad 330 discussed in FIG. 3, keypad 530 does not have the selectable item (331) to place an emergency call because it is a Wi-Fi enabled device. Conversely, similar to FIG. 3, the Wi-Fi enabled device 500 receives alphanumeric characters through the keypad 530 causing the device to display, in a set of boxes 520, either the received characters or visual indications (e.g., symbols) that a passcode is being received.

In this example, the Wi-Fi enabled device receives a selection of the selectable UI item 510 to bypass the device's security scheme and provide a set of contacts with which to initiate communication. If the device is already connected to a network, the Wi-Fi enabled device, of some embodiments, could automatically initiate communication with a specific selected contact. However, in this example, the Wi-Fi enabled device provides the user with a set of preconfigured selectable contacts.

The third stage 503 illustrates the Wi-Fi enabled device's display area after receiving a selection to bypass the device's security scheme as described in greater detail with respect to FIG. 3. The third stage 503 illustrates a selectable contact list 590, including contact 550 (described with respect to contact list 390 and contact 350). In this example, the device receives a selection of contact 550.

The fourth stage 504 illustrates display area 585 after receiving a selection of a contact in order to initiate communication with the contact. In this case, selection of contact 550 of the previous stage causes the Wi-Fi enabled device to display a list of selectable communication types 560 and 561 In this example, the selected contact is available for contact via a text message, or an email. Although this is one example of available communication types for a particular contact, in some embodiments, the device displays different communication types associated with different contacts depending on how the device is configured. For instance, in some embodiments, the device only displays the email option, while in other embodiments, the device displays some combination of two of VoIP call, text message, and email. Other embodiments may not be limited to simply VoIP call, text message or email. In such embodiments, the device will integrate with third party applications (e.g., video conference applications such as Facetime® and Skype®) to initiate contact. Since FIG. 5 refers to a Wi-Fi enabled device, the device must be connected to a network before initiating any sort of communication. Furthermore, to send a text message, the Wi-Fi enabled device will require an external service to transmit the text message to another device that is capable of receiving text messages.

Figure 6:
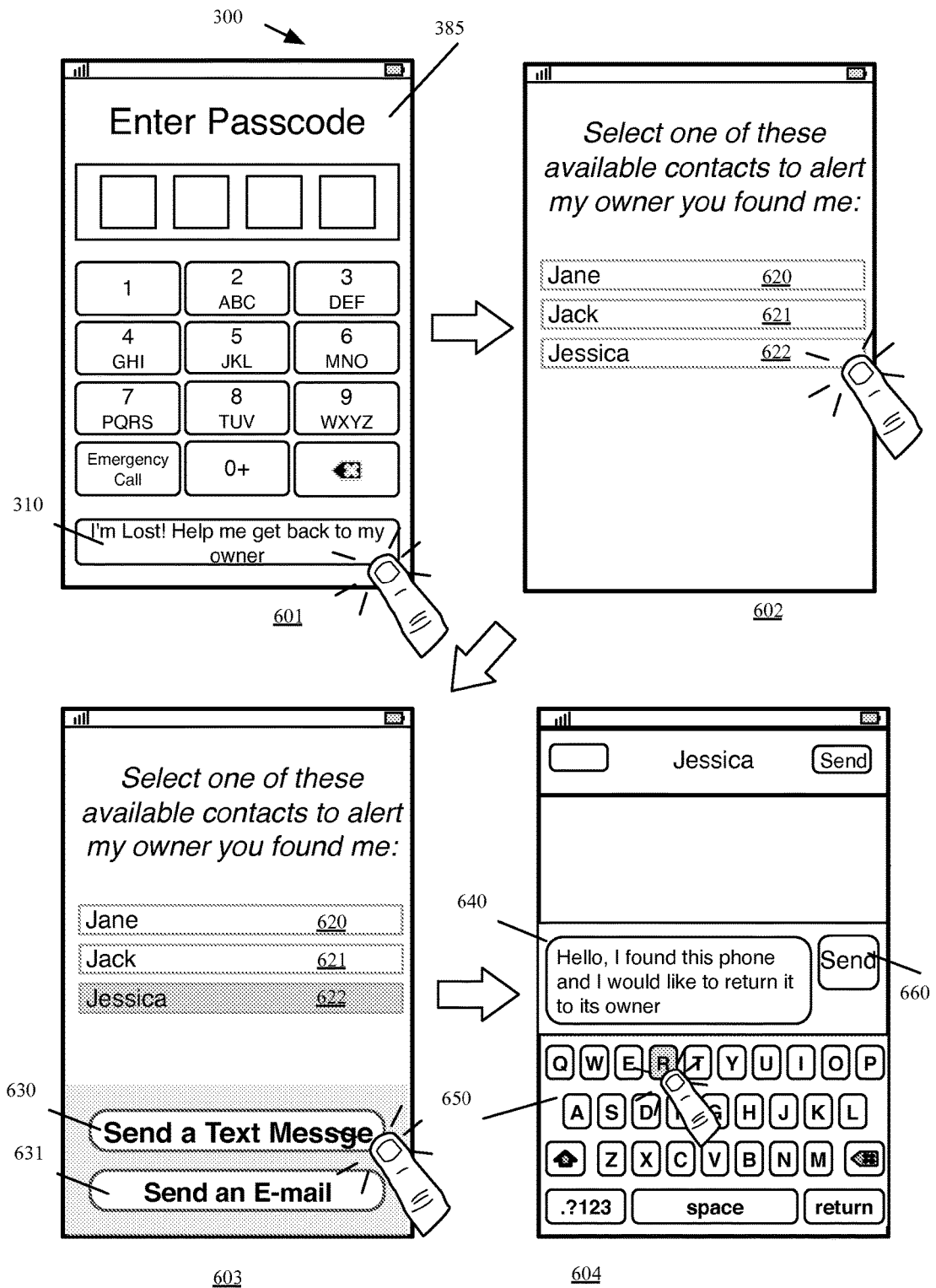
FIG. 6 illustrates an exemplary interface for initiating short message service (SMS) communication with a privileged contact by user interaction with device's display area of some embodiments.

FIG. 6 illustrates an exemplary interface for initiating short message service (SMS) communication with a privileged contact by user interaction with device's display area of some embodiments. In this example, the device is initiating an email with a pre-selected privileged contact. FIG. 6 illustrates a user's interaction with the device 300 in four stages 601-604.

The first stage 601 illustrates receiving a selection of UI item 310 on the device 300, which bypasses the device's security scheme to enter a limited access mode for initiating contact with at least one preselected contact. Some embodiments display the interface of the first stage after receiving a user interaction with the device to unlock the device following a period of device inactivity. The second stage 602 illustrates the device in limited access mode. In this example, the device displays several selectable contacts 620-622 associated with a corresponding contact or group of contacts. The device receives a selection of one of the selectable contacts in order to initiate communication. In this example, the device receives a selection of selectable contact 622.

In the third stage, 603, the selected contact 622 is highlighted and the device displays selectable communication types 630 and 631 in the device display area. The available communication types are predetermined based on the privileged contact configuration as further discussed in Section IV. For instance, if a device owner knows that a specific contact answers phone calls infrequently but responds to text messages quickly, the device owner would likely not configure phone calls on the device for that contact in limited access mode. In this example, the selected contact 622 is associated with the communication methods text message and email. The device receives a selection of communication type 630 in order to send a text message to the selected contact.

The text message interface of the fourth stage 604 includes a display area 640 for displaying text, keypad 650 for entering text, and UI item 660 for initiating transmission of the text displayed in display area 640. The display area 640 is pre populated with a message and/or the device receives entry of a custom message from user interaction with keypad 650. Once the message is complete, the device receives a selection of UI item 660 to send the text in display area 640 as a text message using the stored phone number associated with the selected contact. In some embodiments, this message is sent as an SMS message. Other embodiments transmit this message using multimedia messaging service (MMS) or another method of transmitting text messages.

In some embodiments, the device then returns to the third stage to initiate additional communication. In other embodiments the device returns to the first stage. The device of other embodiments then locks so that it no longer interprets user interactions with the display area.

Figure 7:
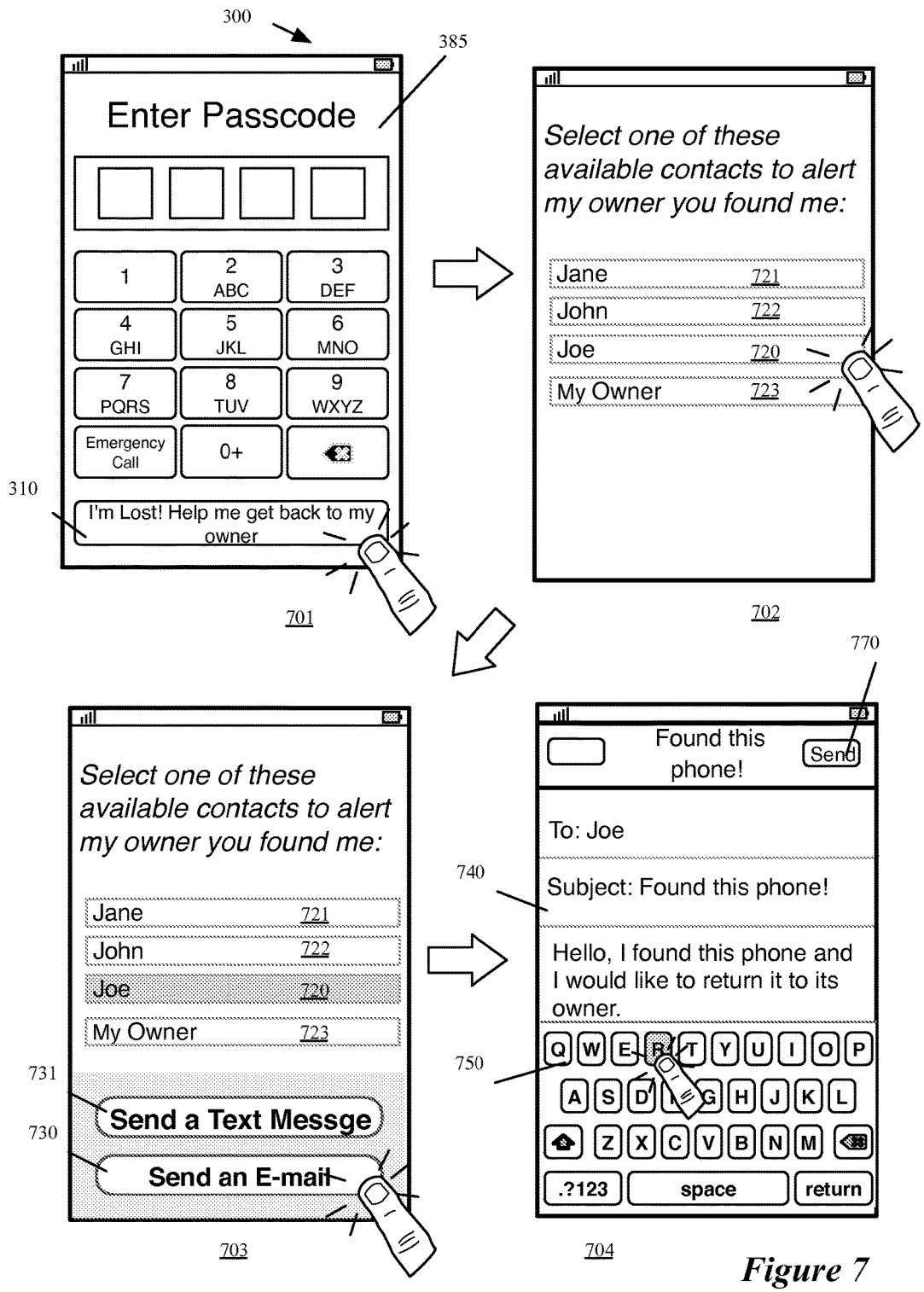
FIG. 7 illustrates an exemplary interface for transmitting an email from a lost device to a privileged contact by interacting with a device's display area of some embodiments.

While text message is a simple way of communicating information regarding a lost device to a pre-selected privileged contact, other communication types are also available in some embodiments. FIG. 7 illustrates an exemplary interface for transmitting an email from a lost device to a privileged contact by interacting with a device's display area of some embodiments. FIG. 7 illustrates a user's interaction with device 300 in four stages 701-704.

The first stage 701 illustrates receiving a selection of UI item 310 on the device 300, which bypasses the device's security scheme to enter a limited access mode for initiating contact with at least one pre-selected contact. Some embodiments display the interface of the first stage after receiving a user interaction with the device to unlock the device following a period of device inactivity. The second stage 702 illustrates the device in limited access mode. In this example, the device displays selectable contacts 720-723, each associated with a corresponding contact or group of contacts. Specifically, in this example, selectable contact 723 is associated with some mechanism of contacting the owner of the device (e.g., by email, alternate phone number, etc.). The device receives a selection of one of the selectable contacts in order to initiate communication. In this example, the device receives a selection of contact 720.

In the third stage, 703, the selected contact is highlighted and a list of selectable communication types 730 and 731 are displayed in the display area 385. The list of communication types are predetermined based on the privileged contact configuration as further discussed in Section IV. In this example, the selected contact 720 is associated with the communication types text message and email. As shown, the device receives a selection of communication type 730 in order to transmit an email to the selected contact.

The email interface of the fourth stage 704 includes a display area 740, keyboard 750, and UI item 770. Display area 740 displays the email message based on received user interaction with keyboard 750. When selected, UI item 770 causes the device to transmit the message displayed in display area 740. The subject and text areas of display area 740 are prepopulated with a subject and message. Alternatively or conjunctively, the device receives a custom message from user interaction with keyboard 750. The "to:" portion of the message window is also prepopulated with the selected contact. However, in some embodiments, the device does not display the actual email address associated with the contact for security purposes, while the device of other embodiments displays the actual email address.

Once the message is complete, the device receives a selection of UI item 770 to send the email as displayed in display area 740. The message is sent via email to one or more stored addresses associated with the selected contact. In some embodiments, the device then returns to the third stage to initiate additional communication. In other embodiments the device returns to the first stage. The device of other embodiments then locks so that it no longer interprets user interactions with the display area.

When utilizing the device in the above described limited access mode, some embodiments allow for different contacts to be associated with different communication types. In some embodiments, the communication types associated with each contact are configured when the set of privileged contacts are each configured. While in other embodiments, the communication types are globally set for all privileged contacts.

Figure 8:
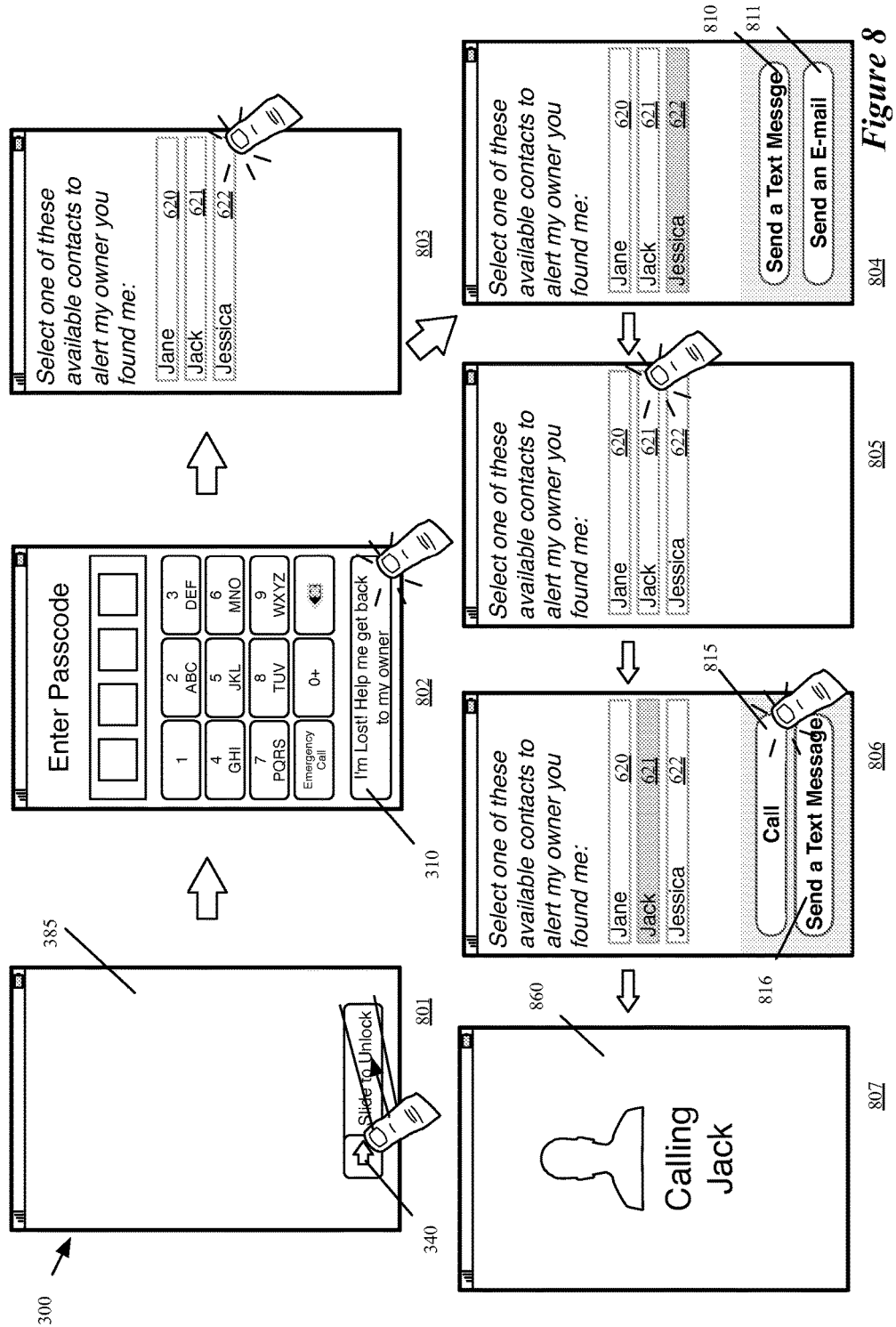
FIG. 8 illustrates an example of a device that bypasses a security scheme where different users are associated with different communication types of some embodiments.

FIG. 8 illustrates an example of a device that bypasses a security scheme where different users are associated with different communication types of some embodiments. Specifically, this figure illustrates a user's interaction with device 300 in seven stages 801-807. The first stage 801 illustrates a device receiving a user interaction with UI item 340. The second stage 802 illustrates the device 300 receiving user interaction with UI item 310 in order to bypass the device's security scheme.

The third stage 803 illustrates the device in limited access mode. The device displays the list of selectable contacts 620-622 described in FIG. 6 in display area 385. In this example, the device receives selection of a first contact 622.

In the fourth stage 804 the device displays selectable communication types 810 and 811 as means of communication with the selected contact. In this example, the device can initiates contact with the first selected contact via a text message, or an email. However, in this example, the device does not receive a selection of either contact type. Instead, in the fifth stage 805, the device receives a selection of a second contact 621. The sixth stage 806 illustrates different communication types 815 and 816 configured for establishing contact with the second selected contact. As shown, the device displays the communication types of calling and sending a text message to the second selected contact. The device receives a selection of communication type 815 to initiate a phone call with the second selected contact. The seventh stage 807 displays an example of an alert 860 that displays in display area 385 when the device initiates a phone call to the second selected contact. The device of some embodiments displays the contact number in device display area 385 while initiating the call. The device of other embodiments keeps this number private for security purposes.

II. Establishing a Network Connection Using a Lost Secured Wi-Fi Enabled Device to Initiate Communication with a Pre-Selected Contact In some cases a device is only capable of initiating contact through an Internet connection. These devices are Wi-Fi enabled devices. Wi-Fi enabled devices have similar capabilities as cellular devices but must make all types of communication over a network other than a cellular network. In such cases, when the device enters the limited access mode, the device requires capability to also connect to a Wi-Fi device such as a router. By establishing a router connection, the Wi-Fi enabled device is able to initiate communication.

Figure 9:
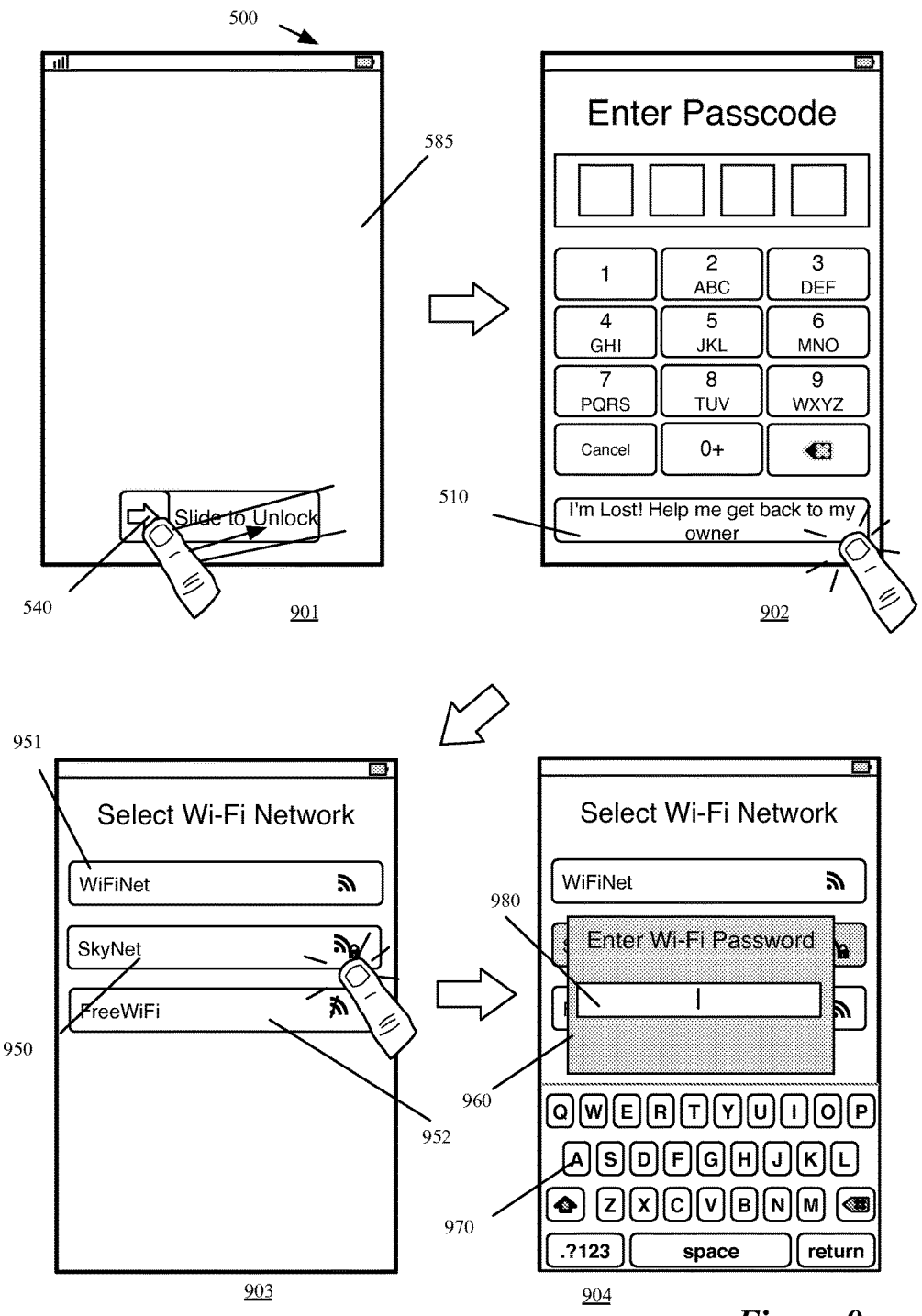
FIG. 9 illustrates a Wi-Fi enabled device that establishes a connection to a Wi-Fi device (e.g., router) through a limited access interface of some embodiments.

FIG. 9 illustrates a Wi-Fi enabled device 500 that establishes a connection to a Wi-Fi device (e.g., router) through a limited access interface of some embodiments. Specifically, this figure illustrates a user's interaction with device 500 in four stages 901-904. The first stage 901 illustrates the Wi-Fi enabled device 500 receiving user interaction with UI item 540. The second stage 902 illustrates the Wi-Fi enabled device receiving a selection of UI item 510 to bypass the device's security scheme and initiate the device's limited access mode.

In limited access mode, the Wi-Fi enabled device displays selectable UI items 950-952, each corresponding to an available Wi-Fi network (if the handheld device is not already connected to a network). The list of networks, in some embodiments includes secure networks that require entry of a password, open networks, or secure networks with special unsecure access available under certain circumstances (discussed in section III). In the third stage 903, the device displays three Service Set Identifiers (SSIDs) of available networks as selectable UI items 950-952 in display area 585. However, in some embodiments, the device displays any number of available network SSIDs. Furthermore, some embodiments provide an option for entering a known network SSID that does not appear in display area 585. The device of some embodiments does not display the list of available networks, but instead, automatically connects to an available network. In such cases, different methods for selecting which network to connect to are employed. For instance, in some embodiments, the Wi-Fi enabled device connects to the network with the strongest signal that is available. In other embodiments, the Wi-Fi enabled device implements a round robin scheme and attempts to connect to a series of networks, one at a time. The device stops attempting to establish a new connection once a connection is established.

Referring back to the third stage 903, the device has received selection of UI item 950 to establish a network connection. Since UI item 950 is associated with a secure network, a password is required to establish a connection with the selected network. Secure networks, in some embodiments, are designated by a visual indicator that is different from unsecure networks.

In the fourth stage 904, the Wi-Fi enabled device displays a pop-up window 960, which includes display area 980 and alphanumeric keyboard 970. In this example, the device receives password information from user interaction with keyboard 970. The device displays the password information in display area 980 as it is received. In some embodiments, display area 980 displays a symbol for each character of the password that has been entered. In other embodiments, display area 980 displays the actual password itself as it is received. Further, the device of some embodiments accepts as input a key phrase and automatically generates the Wi-Fi password from the key phrase.

Figure 10:
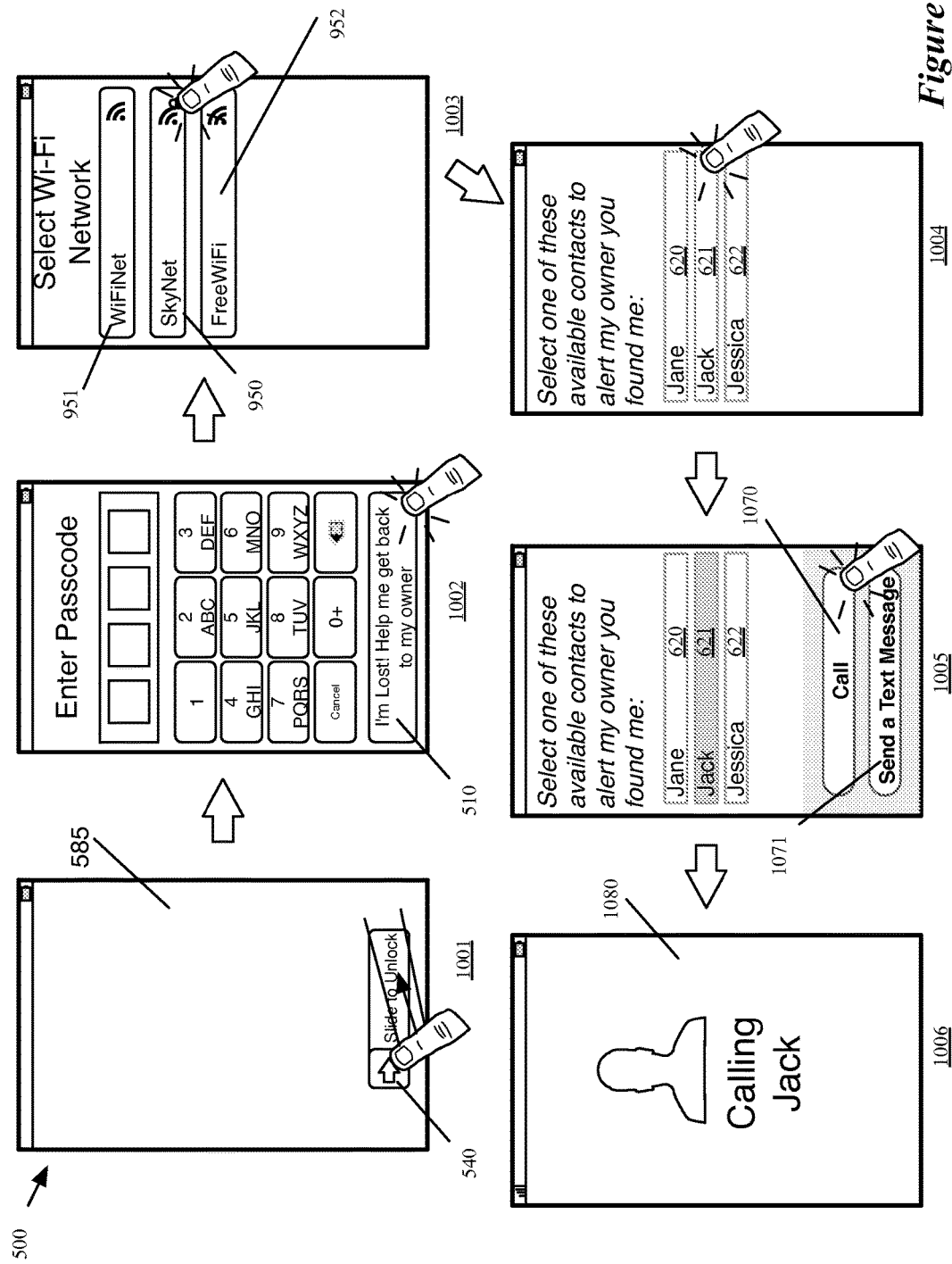
FIG. 10 illustrates an example of a secure Wi-Fi enabled device that initiates communication using a third party application after establishing a network connection of some embodiments.

FIG. 10 illustrates an example of a secure Wi-Fi enabled device 500 that initiates communication using a third party application after establishing a network connection of some embodiments. Specifically, this figure illustrates a user's interaction with device 500 in six stages 1001-1006. The first stage 1001 illustrates the Wi-Fi enabled device 500 receiving user interaction with UI item 540. The second stage 1002 illustrates the Wi-Fi enabled device receiving a selection of UI item 510 to bypass the Wi-Fi device's security scheme and initiate the device's limited access mode. In the third stage 1003, the Wi-Fi enabled device displays selectable UI items 950-952 corresponding to available networks as described in FIG. 9.

The fourth stage 1004 illustrates the device in limited access mode. As shown, the device displays selectable contacts 620-622 in display area 585. Each selectable contact from the list is associated with a pre-selected contact or group of contacts as described in FIG. 6. In this example, the device receives a selection of contact 621.

The device displays a list of selectable communication types 1070 and 1071 associated with the selected contact in the fifth stage 1005. As shown, the device receives a selection communication type 1070 to initiate a call with the selected contact.

In the example described by FIG. 10, since the device is a Wi-Fi enabled device, in order to send a text message or make a phone call, the device initiates contact through a third party application. For instance, the device transmits a text message to an external server, which has the capability of initiating text message communication with a cellular device. Conjunctively or alternatively, the device requires execution of a third party application stored on the device such as Facetime® or Skype® to initiate a video call. The sixth stage 1006 illustrates an example of an alert 1080 displayed in display area 585 after initiating a call on a Wi-Fi enabled device. However, when the device instantiates a third party application to initiate the call, the Wi-Fi enabled device displays the third party application's interface. Further, when the device initiates contact through a third party application, the third party application of some embodiments is limited to initiating contact with only pre-selected contacts.

III. Establishing a Network Connection with a Router Capable of Establishing Restricted Access to Lost Devices In some instances, certain router manufacturers implement a restricted access mode, (e.g., emergency access) which allows a lost, secure Wi-Fi enabled device to connect to a router without router authentication. In such cases, the router restricts device access to the lost device based on some criteria such as disabling access to and/or viewing of other authenticated or unauthenticated devices connected to the router. For instance, the router only permits communication transmissions as opposed to viewing/searching the Internet. Furthermore, the router of some embodiments disables device access after a certain number of transmissions are attempted or a specified amount of data is transmitted over the router to prevent malicious activity.

Figure 11:
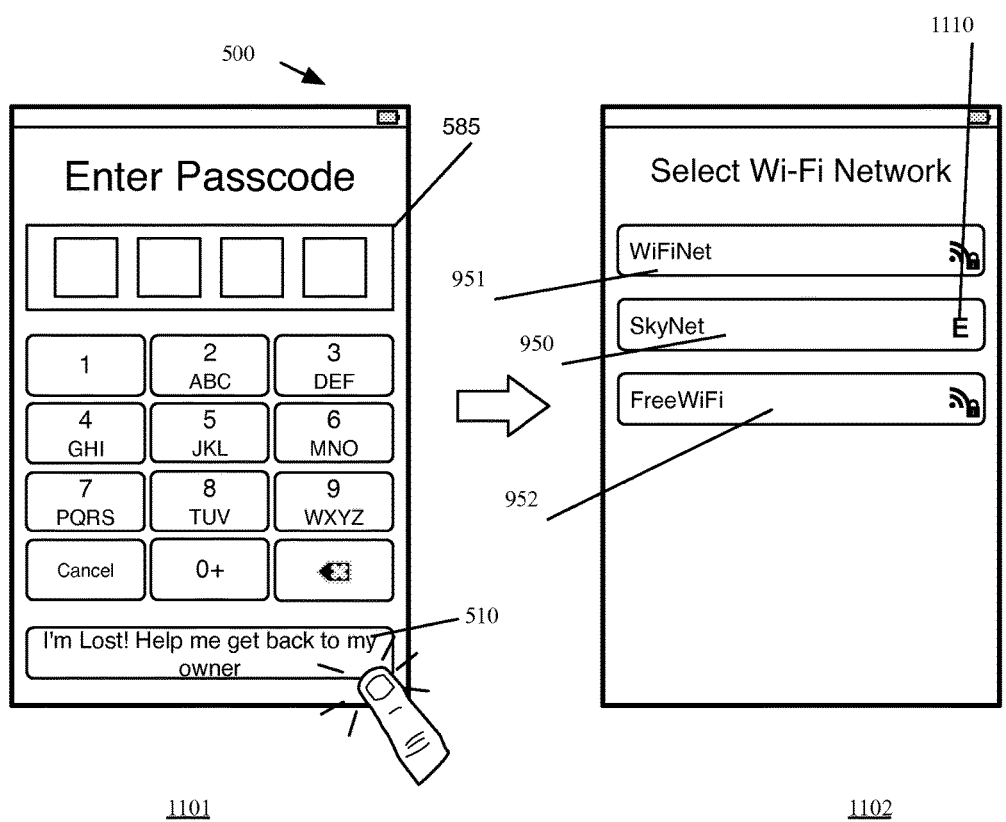
FIG. 11 illustrates an example of a Wi-Fi enabled device of some embodiments attempting to connect to a secured router with restricted access capability for lost devices.

FIG. 11 illustrates an example of a Wi-Fi enabled device of some embodiments attempting to connect to a secured router with restricted access capability for lost devices. The figure illustrates a user's interaction with device 500 in two stages 1101 and 1102.

The first stage 1101 illustrates the Wi-Fi enabled device 500 receiving a selection of UI item 510 to bypass the device's security scheme and initiate the device's limited access mode. Some embodiments display the interface of the first stage after receiving a user interaction with the device to unlock the device following a period of device inactivity.

In the second stage 1102, the device displays similar UI items to that of the third stages of FIG. 9 and FIG. 10. However, in this example, the device displays UI item 950 with a different visual indicator 1110 indicating that this network is capable of establishing a restricted access connection to lost devices to perform a limited set of operations.

Figure 12:
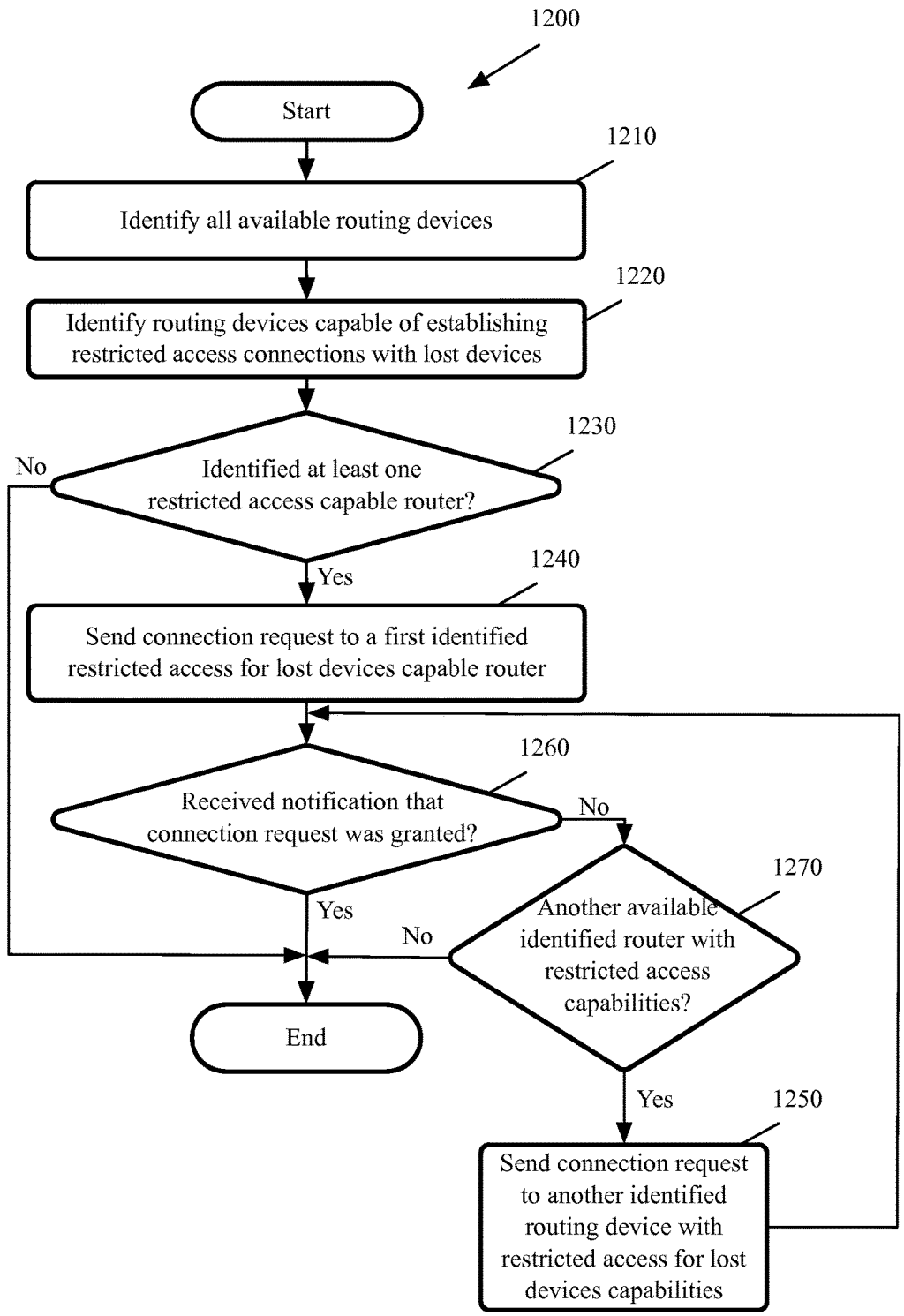
FIG. 12 conceptually illustrates the process of establishing a connection with a secured restricted access capable router for lost devices from a Wi-Fi enabled device.

FIG. 12 conceptually illustrates a process 1200 for establishing a connection with a secured restricted access capable router for lost devices from a Wi-Fi enabled device in some embodiments. Process 1200 is performed by a Wi-Fi enabled device and starts after receiving a selection of a UI item to bypass a device's security scheme in some embodiments. In other embodiments, the process begins only when the device is not currently connected to any router or network.

As shown, the process identifies (at 1210) all available routing devices. In some embodiments, the identified devices are displayed as UI items as in the second stage 1102 of FIG. 11. In other embodiments, the identified list of networks are not displayed. The process then identifies (at 1220) routing devices capable of connecting to Wi-Fi enabled devices with restricted access without router authentication. In some embodiments, the SSIDs associated with these identified routing devices are displayed in a list with a visual designation indicating restricted access connections for lost devices are available as illustrated by UI item 950 in the second stage 1102 of FIG. 11. Process 1200 then determines (at 1230) whether at least one routing device capable of establishing restricted access for a lost device is identified. When no such device is identified, the process ends. When at least one such device is identified, the process sends (at 1240) a connection request to a first identified routing device capable of connecting to a lost device with restricted access. In some embodiments, this operation occurs automatically. In other embodiments, this operation occurs after receiving a user request to connect to the restricted access capable device.

The process then determines (at 1260) whether the connection request to the router was granted. When the connection request is granted, the process ends. Otherwise, the process determines (at 1270) whether another device capable of establishing a restricted connection with a lost device is available. When no device is available, the process ends. Otherwise, the process sends (at 1250) another connection request to another identified restricted access capable router. The process then returns to 1260 and continues until either no devices are left or a connection request is granted.

The device of some embodiments displays a notification when a connection with a routing device is granted. The device of other embodiments only displays the list of privileged contacts once a connection is granted. If a Wi-Fi connection is dropped, the device of some embodiments will attempt to reconnect to a restricted access capable router using the same process conceptually illustrated by FIG. 12. In such embodiments, the device displays a message indicating that the connection was lost. Additionally, the device of some embodiments will first attempt to connect to a restricted access capable router automatically before displaying a list of all available networks for receiving a selection from a user. The process then ends.

Figure 13:
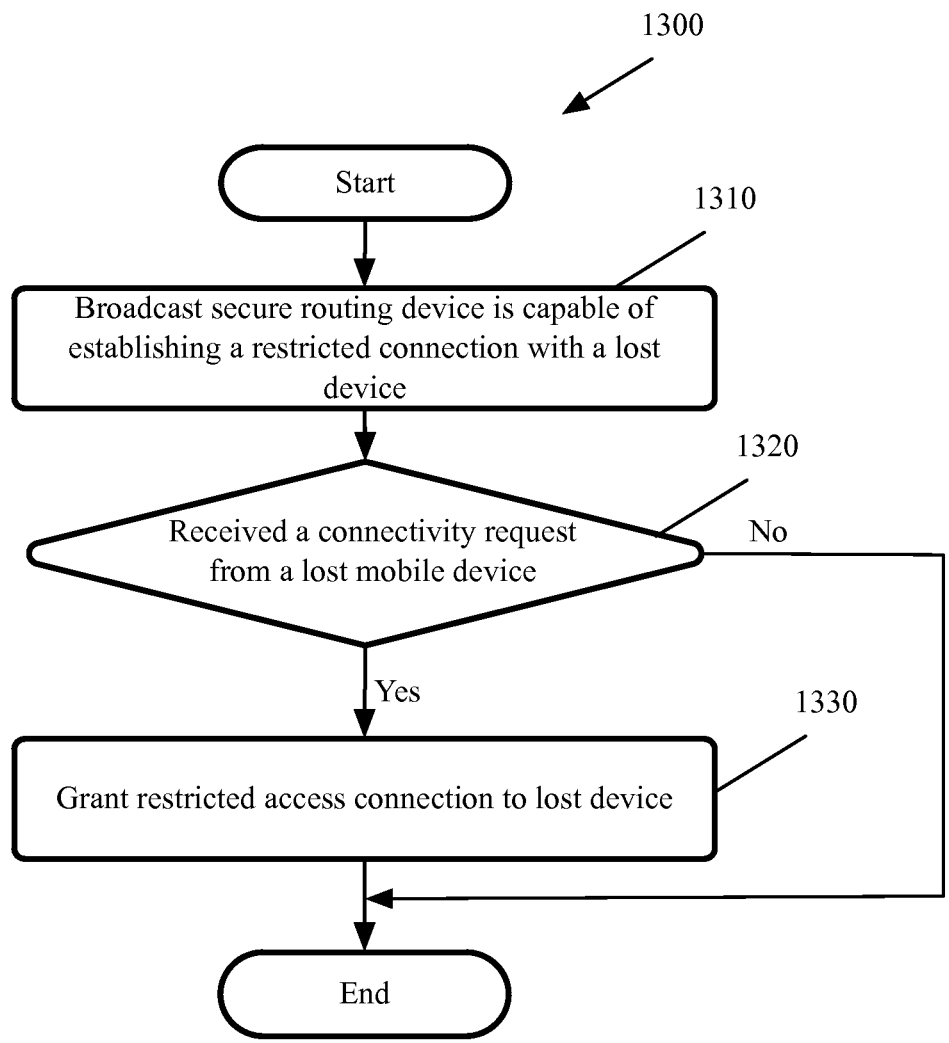
FIG. 13 conceptually illustrates the process of establishing a restricted access connection from a routing device to a lost device of some embodiments.

FIG. 13 conceptually illustrates a process 1300 for establishing a restricted access connection from a routing device to a lost device of some embodiments. The process, in some embodiments, is performed by any routing device capable of establishing a restricted access connection with a lost device.

Process 1300 starts by broadcasting (at 1310) that the router is capable of connecting to Wi-Fi enabled devices that are lost and does not require router authentication. In some embodiments, the router transmits a special signal along with the router's SSIDs that the Wi-Fi enabled device is capable of interpreting as a signal from a special access router (restricted access capable).

The process then determines (at 1320) whether a connectivity request from a Wi-Fi enabled lost device has been received. The connection request of some embodiments includes a special encoding or is transmitted using a specific protocol that the routing device can interpret as coming from a lost device requested special/restricted access. If no such request was received (e.g., a connection request from device that is not lost and/or an unauthenticated request), the process ends. Otherwise, the process grants (at 1330) the lost Wi-Fi enabled device restricted access to the router. The process then ends.

IV. Configuring Privileged Contacts for Secured Devices

In order to enable device functionality that assists an honest finder in locating the owner of a lost device, some embodiments require that the device receive configuration instructions based on user interaction in the event the device is lost. Alternatively or conjunctively, the device enables certain global features associated with initiating communication with privileged (pre-selected) contacts. Conjunctively, the device receives user interaction to configure privileged contacts from the device's stored contact list.

A. Enabling and Global Configuration of Limited Access Mode

Figure 14:
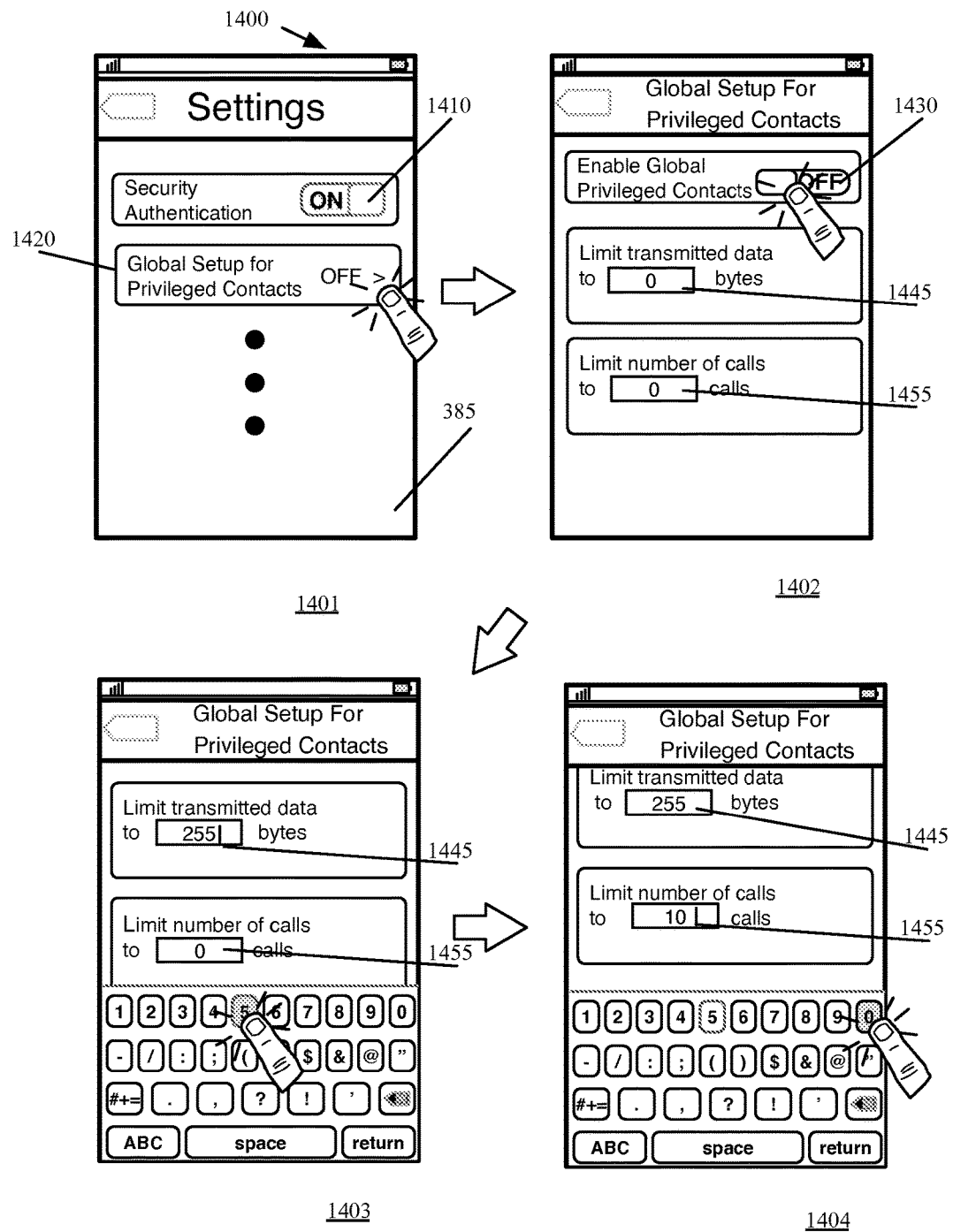
FIG. 14 illustrates an example of globally configuring the device security bypass scheme of some embodiments.

FIG. 14 illustrates an example of globally configuring the device 300's security bypass scheme of some embodiments. As shown, some features of the device's security bypass scheme are globally configured to enable certain global settings related to managing the privileged (pre-selected) contacts. Some embodiments perform this configuration in the setup interface of a device. In some embodiments, the device automatically enables the use of privileged contacts by default, and sets limits for the number of calls and amount of data that can be sent by the device to a privileged contact while the device is passcode protected. In these embodiments, the user is provided with an option to disable or change the limits for contacting privileged users.

FIG. 14 illustrates a user's interaction with device 1400 in four stages 1401-1404. The first stage 1401 illustrates displaying two selectable UI items 1410 and 1420 within display area 385. UI item 1410 enables/disables security authentication on the device and UI item 1420, upon selection, enables global setup for privileged contacts. As shown, security authentication is enabled and the device is receiving a selection of UI object 1420

The second stage 1402 illustrates displaying UI items 1430, 1445, and 1455 in the display area 385. UI item 1430 enables/disables the use of privileged contacts as a means to assist in locating the owner of a lost device. UI items 1445 and 1455 are for setting global limitations on device activity such as data limits and call limits. In some embodiments, UI items 1445 and 1455 are graphically disabled until privileged contacts are enabled. As shown, the UI provides the user with the option to set preconfigured default activity limits. The default activity limits of some embodiments are not customizable and therefore not displayed in the configuration UI of display area 385.

As shown, the device receives a user interaction with UI item 1430 in the second stage to enable privileged contacts. In the third stage 1403, the device receives input, displayed in UI item 1445, from a user for configuring the data limit for limiting the number of bytes of data the device transmits over a specified period of time. In some embodiments, the data is limited to a certain number of bytes over a specific period of time (e.g., minutes, hours, days, etc.). The period of time of some embodiments is configured in the same UI (not shown) used to set the data limit. In other embodiments, the period of time is configured in a different UI. The data limit feature of some embodiments is disabled by leaving the UI item 1445 blank.

The device also receives input, displayed in UI item 1455, from a user to limit the number of calls permitted from the device in the fourth stage 1404. In some embodiments, limiting the number of calls also limits text (SMS) messaging under the same standard. Similar to setting the data limit, the call limit limits the number of calls (or call minutes) from the device over a specified period of time. In some embodiments, the phone calls are limited to a certain number of calls (or minutes) over a specific period of time (e.g., minutes, hours, days, etc.). The period of time of some embodiments is configured in the same UI (not shown) used to set the call limit. In other embodiments, the period of time is configured in a different UI. The call limit feature of some embodiments is disabled by leaving the text box 1455 blank. In the case of a Wi-Fi enabled device, some embodiments disable the option to specify a call limit.

Figure 15:
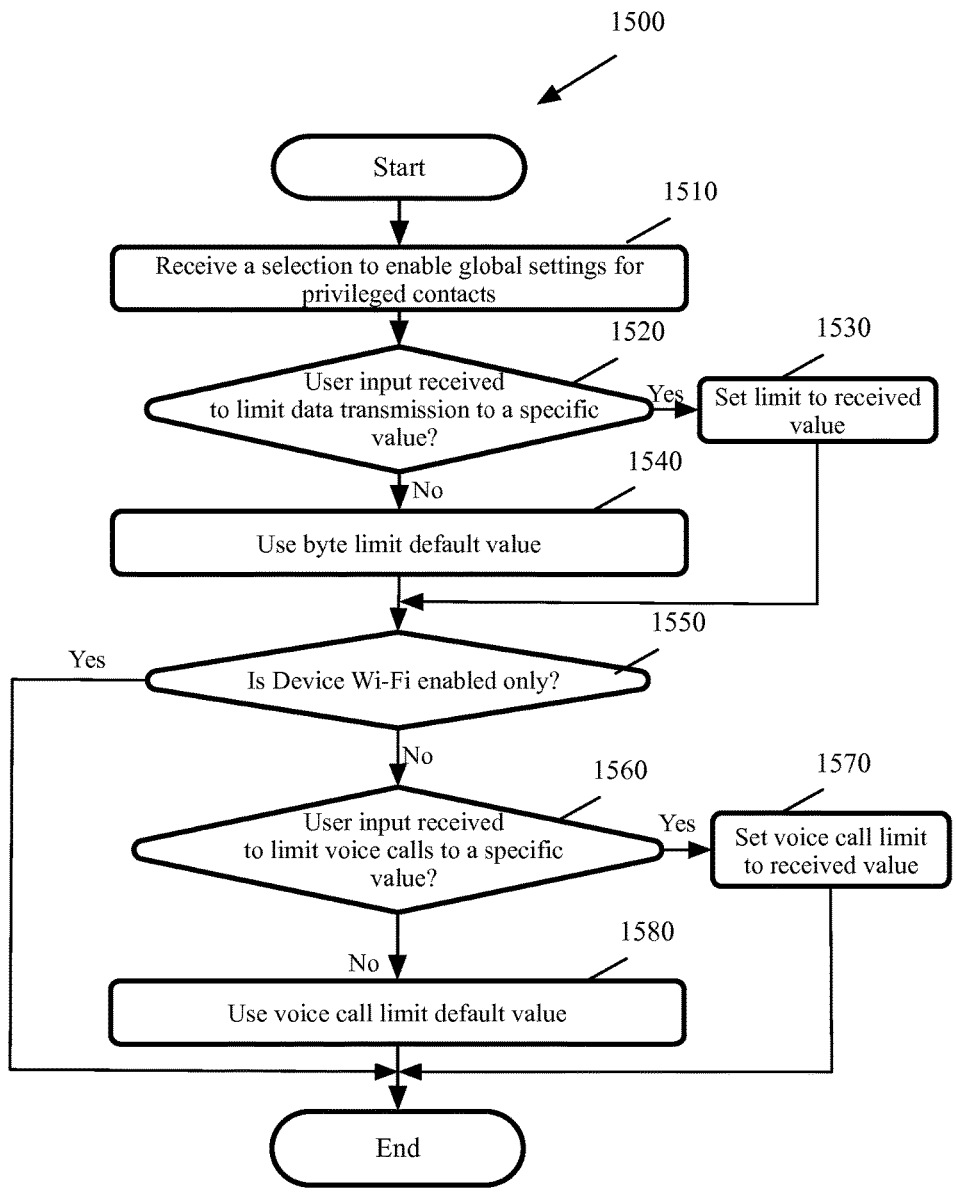
FIG. 15 conceptually illustrates a process 1500 of configuring global setting for privileged contacts of some embodiments.

FIG. 15 conceptually illustrates a process 1500 of configuring global setting for privileged contacts of some embodiments. Process 1500 is performed by a handheld device (e.g., cellular or Wi-Fi enabled, etc.). The process starts after a receiving a selection from a user to enable security authentication on the device.

As shown, process 1500 receives (at 1510) a selection to enable global settings for privileged contacts. In some embodiments, the process receives such a selection based on user interaction UI item 1430 of FIG. 14. The process then determines (at 1520) whether a user input is received to limit data transmission in limited access mode to a specific value. In some embodiments, the value is received from user input displayed in UI item 1445. When the process receives user input to limit data transmission, the process sets (at 1530) the limit to the received value (e.g., value displayed in UI item 1445). As discussed, the value, of some embodiments, is a byte limit over a certain period of time. The process then proceeds to 1550, which is described below. Otherwise, the process uses (at 1540) a default byte limit value for limiting data transmissions. The default byte limit of some embodiments is preconfigured by the device manufacturer. In some embodiments the process optionally receives user input to not set a byte limit.

The process then determines (at 1550) whether the device is a Wi-Fi enabled device without cellular capabilities. When the process is being performed by a Wi-Fi enabled device, the process ends. Otherwise, the process determines (at 1560) whether a user input is received to limit voice calls to a specific value. The value of some embodiments is received from user input displayed in UI item 1455. When the process has received user input to limit calls, the process sets (at 1570) the voice call limit to the received value (e.g., value displayed in UI item 1455). Otherwise, the process uses (at 1580) a default voice call limit. The default call limit of some embodiments is preconfigured by the device manufacturer. In some embodiments, the process optionally receives user input to not set a byte limit. The process then ends.

B. Pre-Selecting Privileged Contacts Using the Device's Stored Contacts

Figure 16:
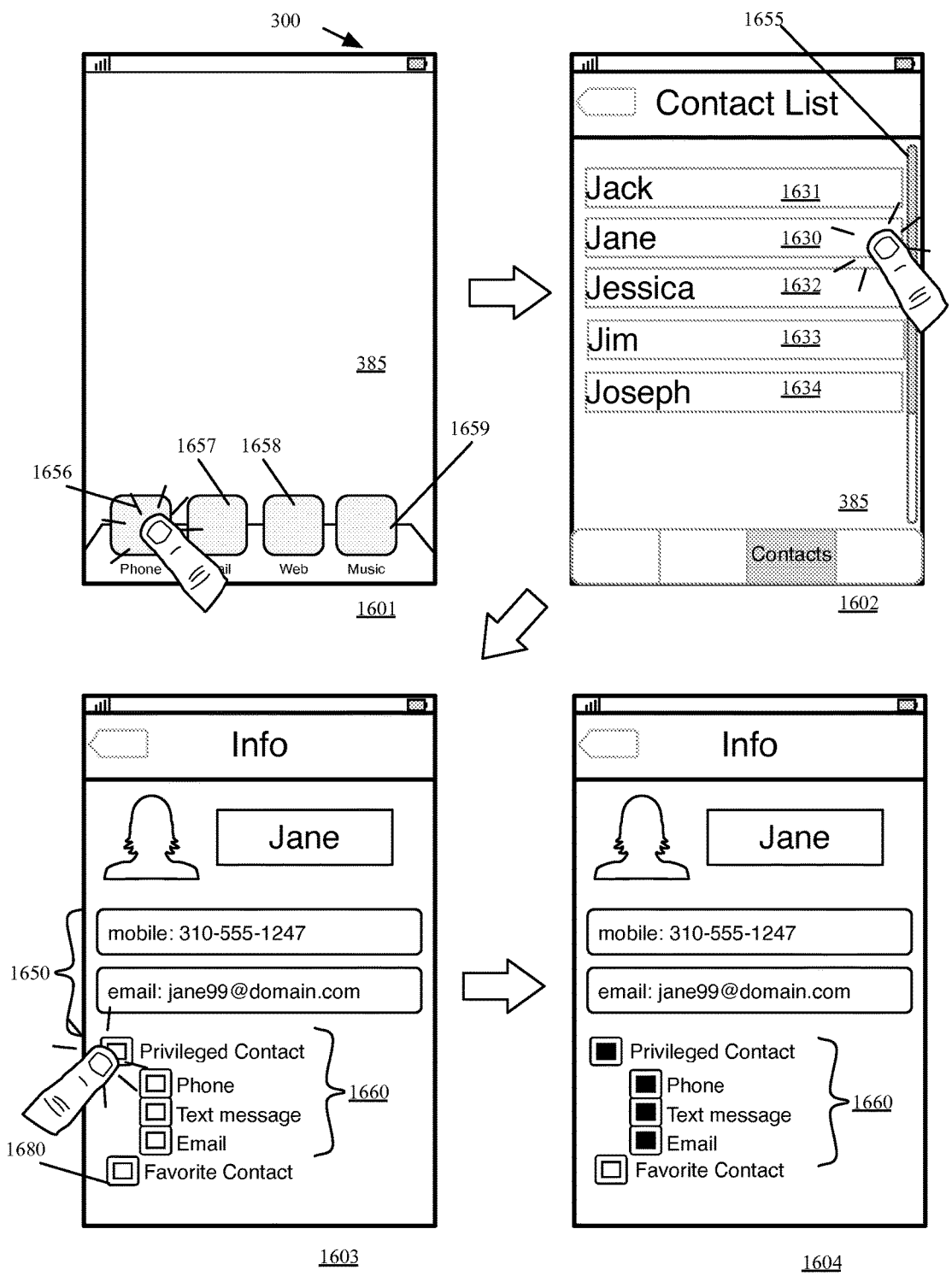
FIG. 16 illustrates configuring a particular privileged contact on a device using the device's stored contact list of some embodiments.

Some embodiments provide an interface integrated with the device's contact list interface with options to configure each contact as a privileged contact. FIG. 16 illustrates configuring a particular privileged contact on a device 300 using the device's stored contact list of some embodiments. The figure illustrates a user's interaction with device 300 in four stages 1601-1604.

The first stage 1601 illustrates display area 385 displaying several selectable UI items 1656-1659 (e.g., icons, etc.). The selectable UI items are just a few examples of selectable UI items displayed in display area 385 in this stage. Some embodiments display the interface of the first stage after receiving a user interaction with the device to unlock the device following a period of device inactivity. Receiving a selection of selectable UI item 1656 causes the device to display the device's contact list. Alternatively, receiving a selection of UI item 1656, in some embodiments, causes the device to display other interfaces related to the phone's functional features. As shown, the device 300 is receiving a selection of UI item 1656.

The second stage 1602 illustrates a list of selectable contacts 1630-1634, each associated with a stored contact or group of contacts in display area 385 and a scrollable region 1655. Selecting one of the selectable contacts causes the device to display attributes associated with the selected contact. While the second stage illustrates display of five selectable contacts, in other embodiments, the device displays any number of contacts. Some embodiments display more contacts that are capable of fitting in display area 385. In such embodiments, the scrollable region 1655 receives user interaction to scroll through the entire list of contacts in the display area. In this example, the device 300 receives a selection of contact 1630.

The third stage 1603 illustrates a display area displaying an example of attributes associated with the selected contact 1630. The third stage displays communication types 1650 and UI items (e.g., buttons, radio dials, check boxes, icons, dropdown list etc.) 1660 and 1680. In this example, the selected contact is associated with a mobile phone number and an email address, which are stored in device memory. The device of some embodiments displays multiple different phone numbers and emails as well as other communication types (e.g., physical address, alternative phone numbers, instant messaging handles etc.). UI item 1660, enables/disables the selected contact as a privileged contact and communication types available when bypassing the device's security scheme. In the third stage 1603, the device 300 receives a selection enabling the selected contact as a privileged contact.

The device also provides the ability to contact a certain popular contact where the same means are described. The device enables the popular contact when UI item 1680 is selected. This feature enables quick access to a device owner's most popular contact such as a close family member. In some embodiments, only a single contact is enabled for this feature. In other embodiments, multiple contacts are enabled as popular contacts. The most popular contact is different from a privileged contact in that it is not subject to the same data and call restrictions configured in the previous global setup of FIG. 14. However, in some embodiments, the most popular contact is subject to the same configuration constraints.

The fourth stage 1604 illustrates the display area of the device after receiving input from a user to designate the selected contact as a privileged contact with options to call, text message, or email when bypassing the device's security scheme. The device of some embodiments uses the mobile number and email already associated with the selected contact stored in the device's contact list as methods of communication with the selected contact when the device is lost. Furthermore, the device of some embodiments automatically selects a popular contact as a privileged contact based on certain criteria such as the last contact contacted or the most frequently contacted contact.

Figure 17:
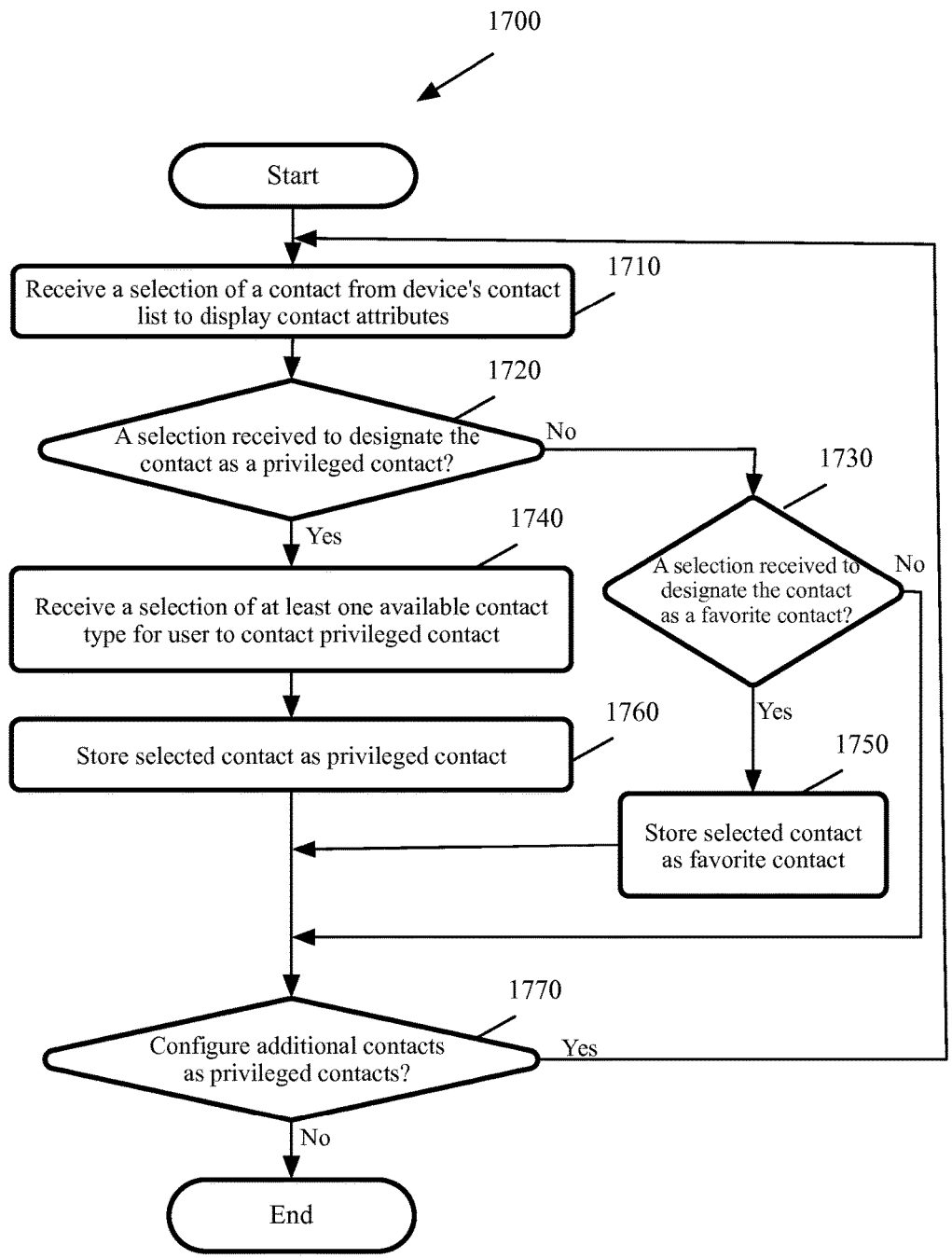
FIG. 17 conceptually illustrates a process 1700 of configuring a privileged contact on a hand held device of some embodiments.

FIG. 17 conceptually illustrates a process 1700 of configuring a privileged contact on a hand held device of some embodiments. The process, in some embodiments is performed by a handheld device. In some embodiments process 1700 starts after a device's security authentication scheme is enabled.

As shown, process 1700 receives (at 1710) a selection of a contact from a devices contact list in order to display the contact's associated attributes. Receiving such a selection is illustrated by the second stage 1602 of FIG. 16 where the device's entire contact list is displayed in display area 385 and a selection of contact 1630 is received. The process then determines (at 1720) whether a selection to designate the selected contact as a privileged contact is received. Prior to 1720, some embodiments of process 1700 display the contact's associated attributes as well as selectable UI items to enable the contact as a privileged contact and set associated communication types (as illustrated by stage 1603 of FIG. 16). When the process receives a selection to designate the selected contact as a privileged contact (e.g., selection of UI item 1660), the process then receives (at 1740) a selection of at least one available contact type for a user to contact the privileged contact. In some embodiments the selectable contact types are those associated with UI item 1660 of FIG. 16. The process then stores (at 1760) the contact as a privileged contact. The process then proceeds to 1770, which is described below.

When the process determines (at 1720) that it has not received a selection to enable the selected contact as a privileged contact, the process determines (at 1730) whether a selection is received to designate the selected contact as a favorite contact (discussed above with respect to UI item 1680). If not, the process proceeds to 1770, which is described below. Otherwise, the process stores (at 1750) the selected contact as a favorite contact. The process of some embodiments also receives selections of contact types to use in contacting the favorite contact. Other embodiments default to a particular contact type. The default contact type of some embodiments is the most frequent contact type used to initiate communication with the selected contact or all contacts.

The process determines (at 1770) whether additional contacts are available to configure as privileged contacts. When additional contacts are available, the process returns to 1710, which was described above. Otherwise, the process ends. Although FIG. 17 illustrates operation 1730 as following operation 1720, some embodiments of the process perform these operations interchangeably. Specifically, in such embodiments, operation 1730 is performed before or concurrently with operation 1720.

Figure 18:
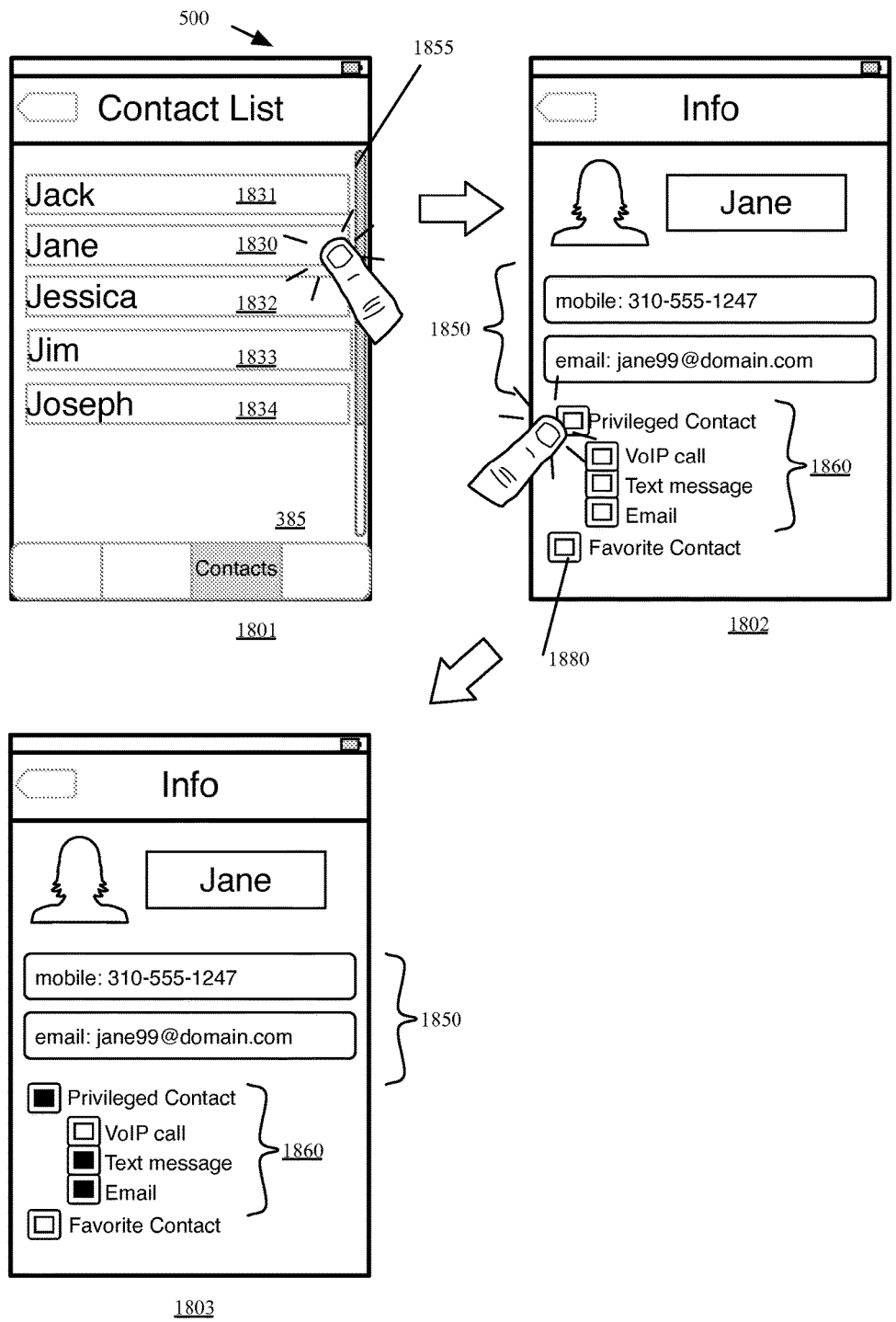
FIG. 18 illustrates configuring a particular privileged contact on a Wi-Fi enabled device using the device's stored contact list of some embodiments.

FIG. 18 illustrates configuring a particular privileged contact on a Wi-Fi enabled device 500 using the device's stored contact list of some embodiments. A Wi-Fi enabled device lacks any cellular connectivity capability. Thus, although the configuration UI of a Wi-Fi enabled device is similar, the available options for initiating contact differ from that of a device with cellular capabilities. FIG. 18 illustrates a user's interaction with the device 500 in three stages 1801-1803.

In the first stage, the device displays a list of contacts stored on a Wi-Fi enabled device as selectable contacts 1830-1834 and scrollable region 1855. In some embodiments, the device displays selectable contacts 1830-1834 after receiving a user interaction from the Wi-Fi enabled device to display the list of contacts, such as the user interaction with UI item 1656 described with respect to FIG. 16. Selecting one of UI items 1830-1834 causes the device to display attributes associated with the associated contact. While the second stage illustrates display of five contacts, in other embodiments, the device displays any number of contacts. Some embodiments display more contacts that are capable of fitting in display area 585. In such embodiments, the scrollable region 1855 receives user interaction to scroll through the entire list of contacts in the display area. In this stage, the device 500 receives a selection of contact 1830.

The second stage 1802 illustrates displaying an example of attributes associated with the selected contact. The second stage displays communication types 1850 and UI items (e.g., buttons, radio dials, check boxes, icons, dropdown list etc.) 1860 and 1880. In this example, the selected contact is associated with a mobile phone number and an email address, which are stored on device memory. The device of some embodiments displays multiple different phone numbers and emails as well as other communication types (e.g., physical address, alternative phone numbers, instant messaging handles). UI item 1860, enables/disables the selected contact as a privileged contact and sets communication types. In the second stage 1802, the device 500 receives a selection to enable the selected contact 1803 as a privileged contact. Although sharing many of the UI items described in the third stage 1603 of FIG. 16, the second stage 1802 of FIG. 18 differs in that it is designed for a Wi-Fi enabled device. Specifically, since a Wi-Fi enabled device is incapable of making a cellular voice call, UI items 1860 include an option to make a VoIP call. In some embodiments a VoIP call requires a third party internal and/or external application. Some embodiments provide a means to make the VoIP call using an application running on an external server.

As described with respect to FIG. 16, the Wi-Fi enabled device also provides the ability to contact a certain popular contact where the same means are described by enabling UI item 1880. This feature was discussed in detail with respect to UI item 1680.

The third stage 1803 illustrates the device after receiving input to designate the selected contact as a privileged contact with options to text message, or email enabled. The device of some embodiments uses the email already associated with the selected contact stored in the device's contact list as a method of communicating with the selected contact when the device is lost. Additionally, in some cases, sending a text message would require the use of a third party internal and/or external application to transmit the message to the privileged contact. As discussed above, if the Jane was enabled for VoIP contact, a third party internal and/or external application would be required to complete such communication.

Configuring a privileged contact through a device's contact list is one method for enabling specific contacts as available for assisting an honest finder in tracking down a lost device's owner. However, the device of other embodiments configures privileged contacts in interfaces outside of the contact list interface. While some embodiments will automatically configure a default privileged contact based on certain criteria such as the last contacted contact or the most frequently used contact. Moreover, the device of some embodiments provides the user the option to enter contact information for a privileged contact not currently stored in the contact list. In such embodiments, the privileged contact is only available for initiating communication when the device's security scheme is bypassed.

V. Providing Alerts When Activity Limits are Reached for Initiating Communication with Pre-Selected Contacts In order to prevent abuse or malicious activity, some embodiments allow the device owner to enable certain communication limits associated with contacting privileged contacts as previously discussed in Section IV. Such limits would only apply if an unauthenticated user attempts to use the limited access mode of the device to initiate contact with the pre-selected contacts using the device.

Figure 19:
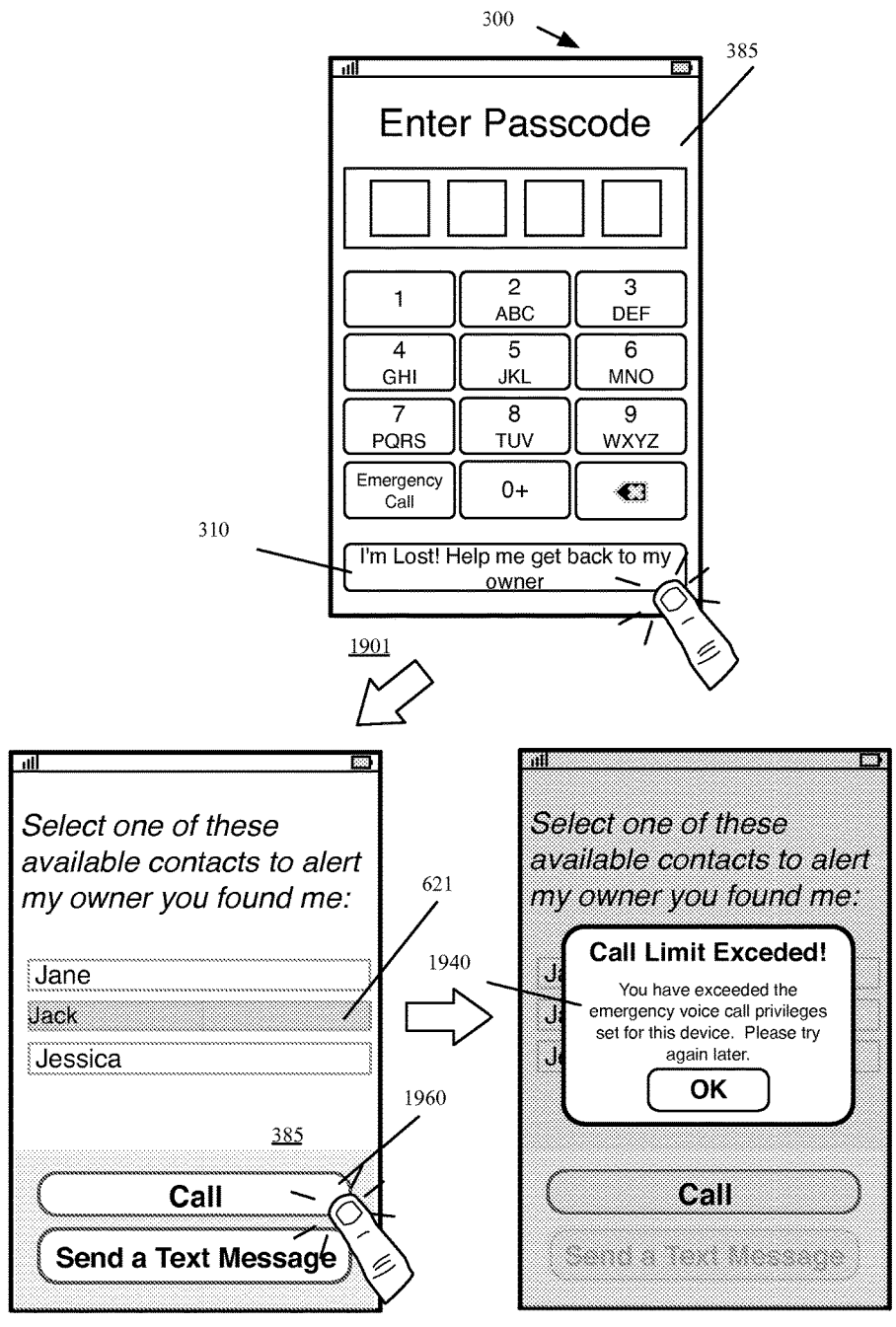
FIG. 19 illustrates an example of a device's display area in the event of reaching a preconfigured limit for voice call activity of some embodiments.

FIG. 19 illustrates an example of a device's display area in the event of reaching a preconfigured limit for voice call activity of some embodiments. This limit is tied to the limits set in FIG. 14. FIG. 19 illustrates a user's interaction with device 300 in three stages 1901-1903. The first stage 1901 illustrates the device receiving a selection of UI item 310 to bypass the device's security scheme and initiate the device's limited access mode. Some embodiments display the interface of the first stage after receiving a user interaction with the device to unlock the device following a period of device inactivity.

The second stage 1902 illustrates display area 385 after receiving a selection of contact 621. In the second stage 1902, the device receives a selection of communication type 1960 to initiate a call with the selected contact. However, in this case, the device is attempting to initiate too many calls or has used too many minutes in limited access mode.

The third stage 1903 illustrates providing an alert that the device already attempted too many calls. In this case, the device is inoperable for the purpose of placing calls in limited access mode. The device would still be operational for placing calls in the event of a correct passcode being entered in the first stage 1901 to authenticate the user. In some embodiments, the device displays a pop-up window 1940 to notify the unauthenticated user that the device has reached the call limit, which was set by the owner during privileged contact configuration. The unauthenticated user, in some embodiments, must wait until the specified period of time passes before the device attempts another call if such a period of time was implemented.

Figure 20:
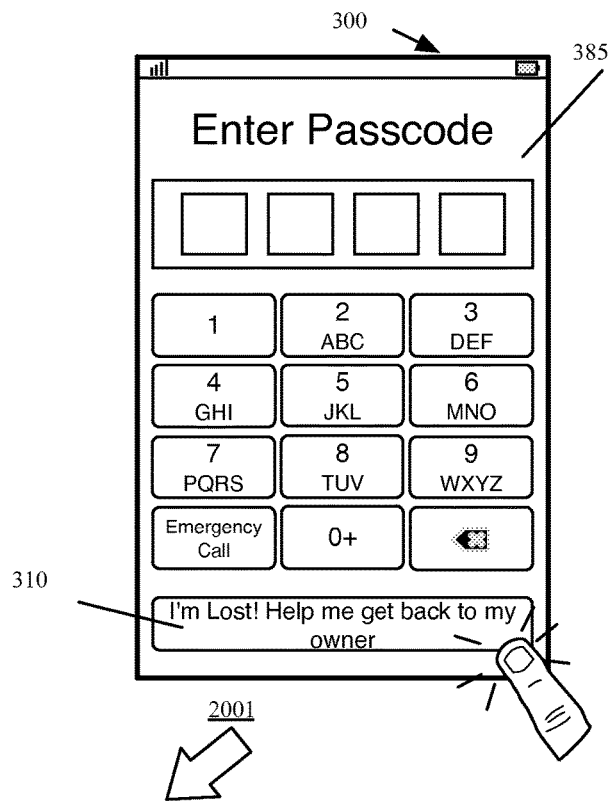
FIG. 20 illustrates an example of a device's display area in the event of reaching a preconfigured limit for data transmission of some embodiments.
Figure 20:
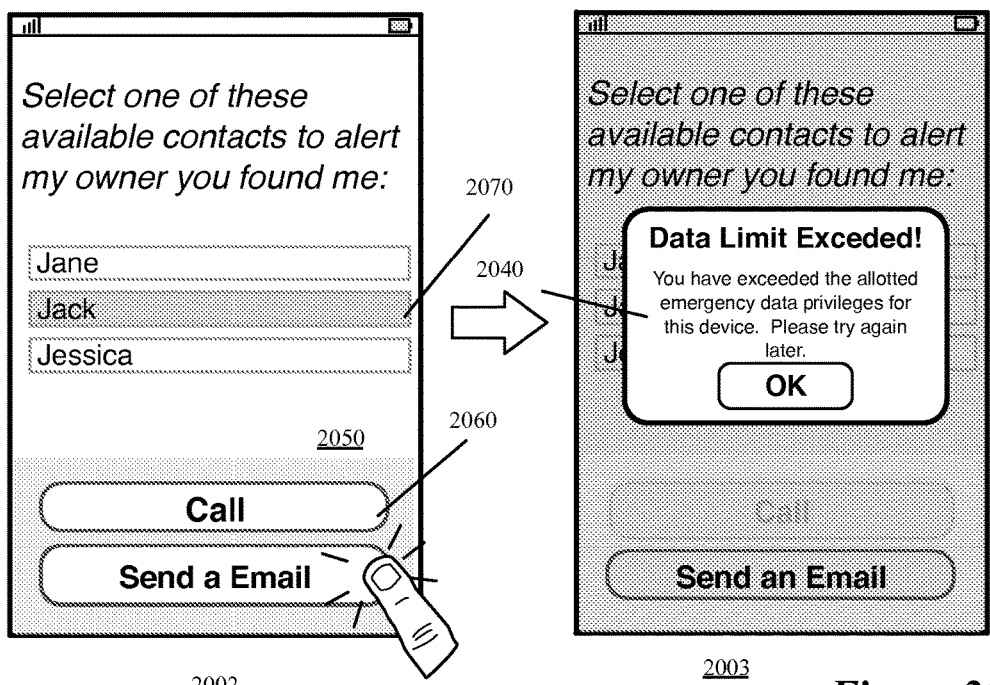

Similarly, FIG. 20 illustrates an example of a device's display area in the event of reaching a preconfigured limit for data transmission of some embodiments. This limit is tied to the limits set in FIG. 14. The figure illustrates a user's interaction with device 300 in three stages 2001-2003.

The first stage 2001 illustrates the device receiving a selection of UI item 310 to bypass the Wi-Fi device's security scheme and initiate the device's limited access mode. Some embodiments display the interface of the first stage after receiving a user interaction with the device to unlock the device following a period of device inactivity.

The second stage 2002 illustrates display area 385 after receiving a selection of contact 2070. In the second stage 2002, the device receives a selection of communication type 2060 to initiate an email with the selected contact. However, in this case, the device is attempting to transmit too much data.

The third stage 2003 illustrates providing an alert that the device already reached the data transmission limit. In this case, the device is inoperable for the purpose of performing any task that involves data transmission in limited access mode. The device is still operational for transmitting data in the event of entering a correct passcode in the first stage 2001 to authenticate the user. In some embodiments, the device displays a pop-up window 2040 to notify the unauthenticated user that the device has reached the data transmission limit, which was previously configured. The unauthenticated user must wait until the specified period of time passes before the device can attempt another email if such a period of time was implemented.

In some embodiments, the data transmission limit has not yet been reached when the device received a selection from the unauthenticated user to email the selected contact. In such embodiments, the device still displays the email interface. However, when the device attempts to send the email the device recognizes that transmitting the email will exceed the byte limit. The device of some embodiments displays a pop-up window indicating that the message is too large and provide user an opportunity to shorten the message. The device of other embodiments transmits the message even though it causes the device to exceed the configured byte limit, but disable any subsequent data transmissions. In such embodiments, the device then displays a pop-up notifying the user that the device previously exceeded the data limit.

VI. System Architecture

Figure 21:
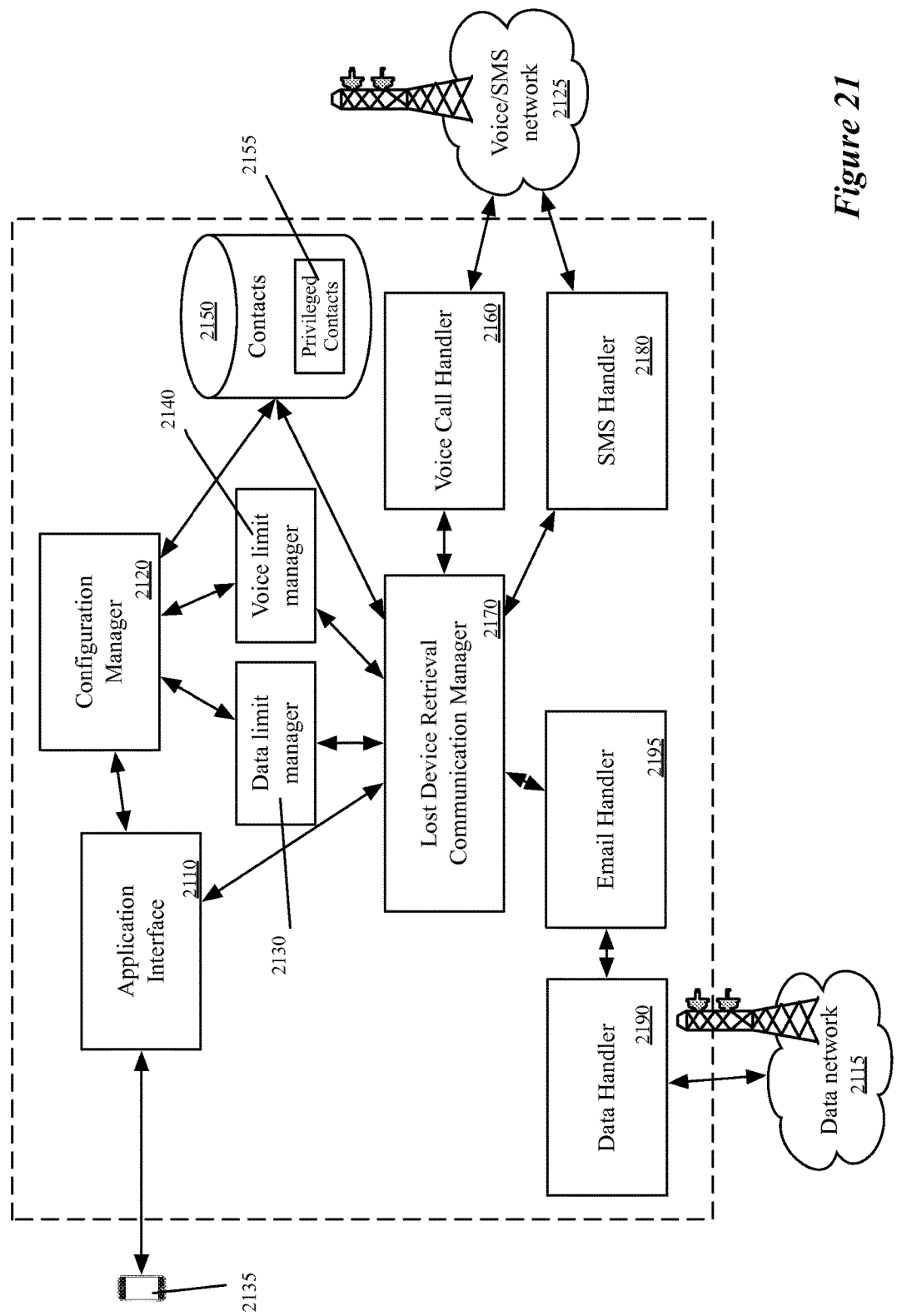
FIG. 21 is example of an architecture of the limited access system on a cellular capable device of some embodiments.

The limited access mode of some embodiments operates on either a cellular handheld device or a Wi-Fi enabled device. FIG. 21 is example of an architecture of the limited access system on a cellular capable device of some embodiments. Examples of cellular devices include smartphones and tablets. As show, the limited access system includes an application interface 2110, which operates on device 2135. The limited access system also includes a configuration manager 2120, data limit manager 2130, voice limit manager 2140, stored contacts 2150, lost device retrieval communication manager 2170, voice call handler 2160, SMS handler 2180, data Handler 2190, and email handler 2195.

Stored contacts 2150 also includes stored privileged contacts 2155. The stored privileged contacts 2155 include information about which contacts from the contact list are designated as privileged contacts and what methods of communication are available to communicate with the stored privileged contact. Stored contacts 2150 is communicatively coupled to configuration manager 2120 which configures the devices privileged contacts and the lost device retrieval manager which handles initiation of communication with a selected privileged contact retrieved from the stored privileged contacts 2155.

The configuration Manager 2120 is also communicatively coupled to the application interface as well as the voice and data limit managers 2130 and 2140. The configuration manager 2120 receives input from the application interface 2110 regarding which contacts are selected as privileged contacts and flags those contacts in the contact storage. The configuration manager 2120 also receives settings of data and voice limits from the application interface 2110 and provides those limits to the data and voice limit managers 2130 and 2140.

The data limit manager 2130 and voice limit manager 2140 are also communicatively coupled to the lost device retrieval communication manager 2170. When a communication, either data or cellular, is initiated, the lost device retrieval manager will first check that proceeding with the transmission will not exceed either the voice or data limit. If the appropriate limit is not exceeded, the lost device retrieval manager 2170 will update a counter based on the type of communication being initiated.

The lost device retrieval communication manager 2170 is also communicatively coupled with three communication handlers, the voice call handler 2160, the SMS, or text message handler 2180, and the email handler 2195. The lost device retrieval communication manager 2110 is also communicatively coupled with the application interface 2110 for displaying the communication initiation interfaces to the unauthenticated user.

When the lost device retrieval communication manager 2170 receives a request to initiate communication from the application interface 2110, the lost device retrieval communication manager 2170 will route the call to the appropriate handler. For instance if a request to place a phone call is received, the lost device retrieval communication manager will route the request to the voice call handler which will handle the call placed over the Voice/SMS network 2125. Similarly a request to send a text message would cause the lost device retrieval communication manager to route the request to the SMS handler 2180 which would transmit the message over the Voice/SMS network 2125. And a request to send an email would cause the lost device retrieval manager to route the request to the email handler 2195, which is communicatively coupled to the data handler 2190. The data handler would then transmit the email over the data network 2115. In some embodiments the email handler is an application running on the device. In some embodiments, the data and voice networks operate using any cellular protocol such as LTE, EV-DO(1xEV-DO), UMTS, HSPA, EDGE, GSM, and/or CDMA. Although illustrated separately, in some embodiments the data network 2115 and the voice network 2125 are combined as one network.

Figure 22:
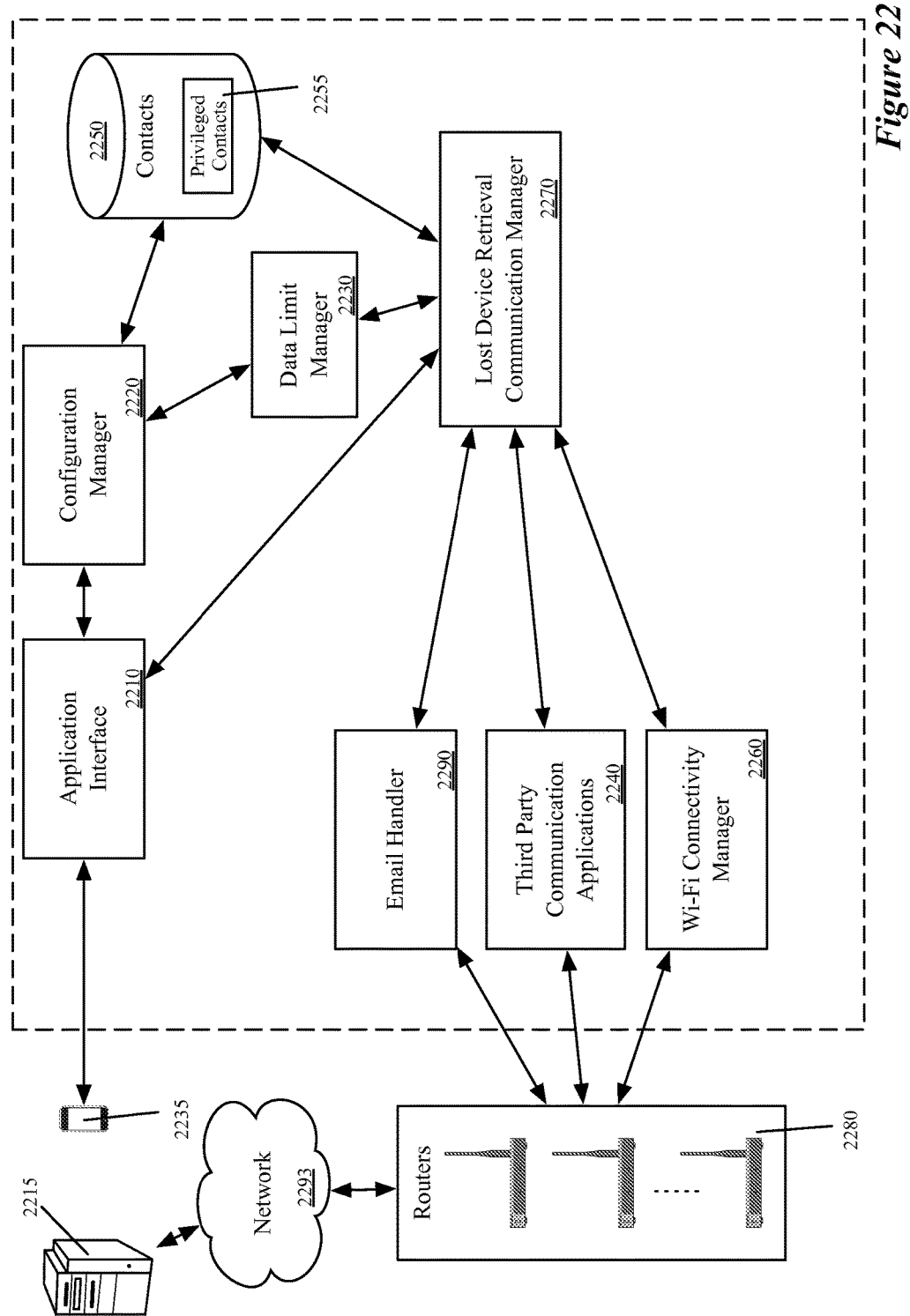
FIG. 22 is example of an architecture of the limited access system running on a Wi-Fi enabled device of some embodiments.

FIG. 22 is example of an architecture of the limited access system running on a Wi-Fi enabled device of some embodiments. Examples of Wi-Fi enabled handheld devices include music players and tablets. As show, the limited access system includes an application interface 2210, which operates on device 2235. The limited access system also includes a configuration manager 2220, data limit manager 2230, stored contacts 2250, lost device retrieval communication manager 2270, third party communication applications 2240, Wi-Fi connectivity manager 2260, and email handler 2290.

Stored contacts 2250 also includes stored privileged contacts 2255. The stored privileged contacts 2255 include information about which contacts from the contact list are designated as privileged contacts and what methods of communication are available to communicate with the stored privileged contact. Stored contacts 2250 is communicatively coupled to configuration manager 2220 which configures the devices privileged contacts and the lost device retrieval manager which handles initiation of communication with a selected privileged contact retrieved from the stored privileged contacts 2255.

The configuration manager 2220 is also communicatively coupled to the application interface as well as the data limit manager 2230. The configuration manager 2220 receives input from the application interface 2210 regarding which contacts are selected as privileged contacts and flags those contacts in the contact storage. The configuration manager 2220 also receives settings of a data limit from the application interface 2210 and provides those limits to the data limit manager 2230.

The data and limit manager 2230 is also communicatively coupled to the lost device retrieval communication manager 2270. When a communication the lost device retrieval manager will first check that proceeding with the transmission will not exceed the data limit. If the appropriate limit is not exceeded, the lost device retrieval manager 2270 will update a counter based on the type of communication being initiated.

The lost device retrieval communication manager 2270 is also communicatively coupled with the email handler 2290, third party communication applications 2240 and the Wi-Fi connectivity manager 2260. In order for any data transmission to occur, the device must first be connected to an external router 2280. Before communication is initiated the lost device retrieval communication manager will send a request to the Wi-Fi connection manager 2260 to establish a network connection. The Wi-Fi connection manager will receive broadcasts from nearby routers and establish a connection based on the criteria discussed in sections II and III.

Once a connection is established, the lost device retrieval communication manager will route requests received from the application interface 2210 appropriately. For instance, if a request to send an email is received at the lost device retrieval communication manager 2270, the request will be forwarded to the email handler 2290 which will transmit the email using one of the routers 2280. In some embodiments, the application interface will forward a request to transmit a text message. In such embodiments, the request will be forwarded through the email handler 2290 and transmitted through a router 2280 over the network 2293 to an external server 2215 which is running an application capable of transmitting text messages. In some embodiments, the lost device retrieval communication manager will receive a request to use a third party application such as Facetime® or Skype®. In such embodiments, the request will be sent to the third party application which will initiate communication over the network 2293 using one of the routers 2280.

VII. Electronic System

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random access memory (RAM) chips, hard drives, erasable programmable read-only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

A. Mobile Device

Figure 23:
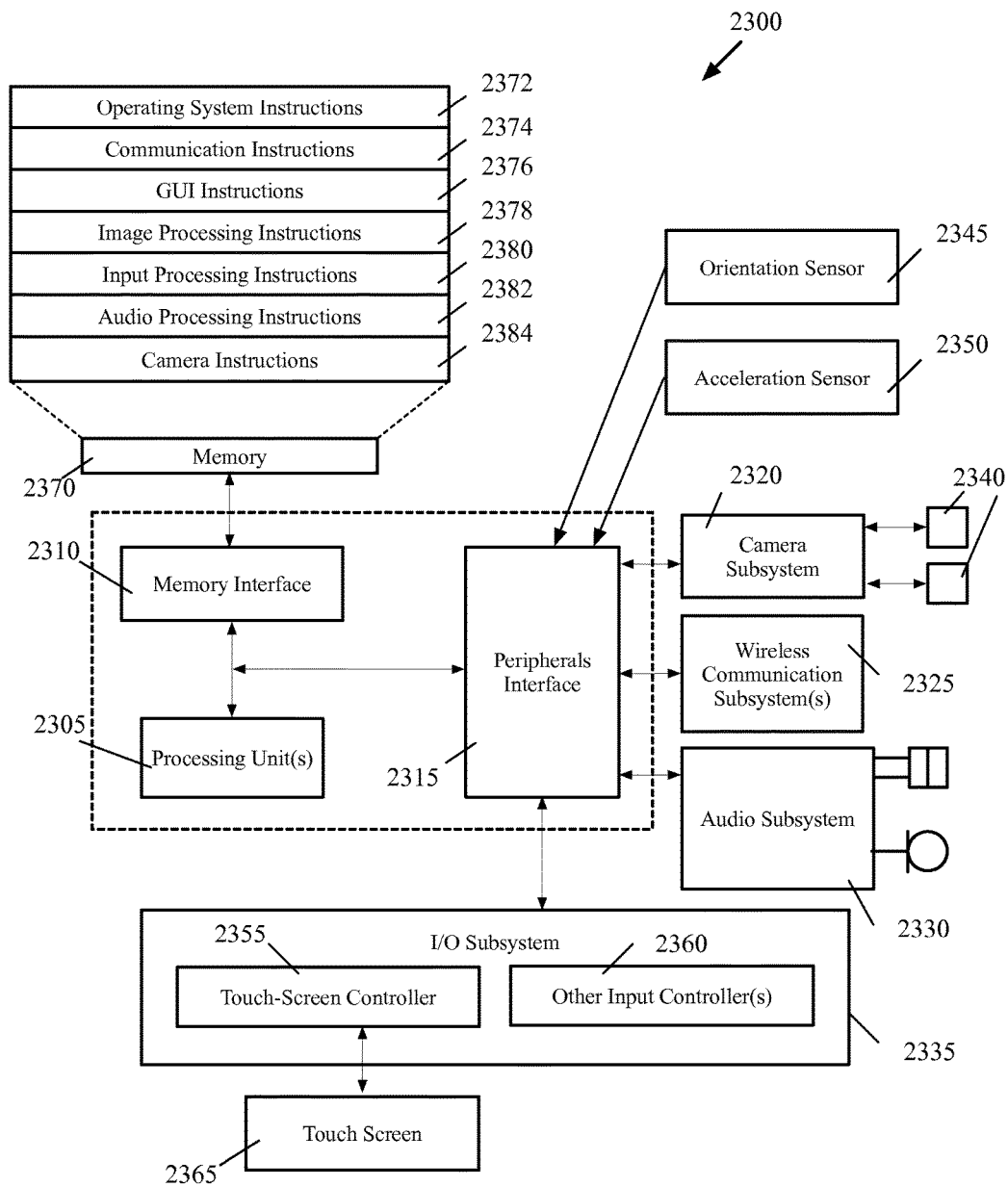
FIG. 23 is an example of an architecture of a mobile computing device in some embodiments of the invention.

Several applications such as the content authoring and publishing application, the digital content viewing application, and multimedia management application of some embodiments operate on mobile devices, such as smart phones (e.g., iPhones®), tablets and touchpads (e.g., iPads®), ebook readers (e.g., Kindle®), or multimedia devices (e.g., IPods®). FIG. 23 is an example of an architecture 2300 of such a mobile computing device. In some embodiments, mobile computing devices include cellular devices and Wi-Fi enabled devices that do not have cellular capability. As shown, the mobile computing device 2300 includes one or more processing units 2305, a memory interface 2310 and a peripherals interface 2315.

The peripherals interface 2315 is coupled to various sensors and subsystems, including a camera subsystem 2320, a wireless communication subsystem(s) 2325, an audio subsystem 2330, an I/O subsystem 2335, etc. The peripherals interface 2315 enables communication between the processing units 2305 and various peripherals. For example, an orientation sensor 2345 (e.g., a gyroscope) and an acceleration sensor 2350 (e.g., an accelerometer) are coupled to the peripherals interface 2315 to facilitate orientation and acceleration functions.

The camera subsystem 2320 is coupled to one or more optical sensors 2340 (e.g., a charged coupled device (CCD) optical sensor, a complementary metal-oxide-semiconductor (CMOS) optical sensor, etc.). The camera subsystem 2320 coupled with the optical sensors 2340 facilitates camera functions, such as image and/or video data capturing. The wireless communication subsystem 2325 serves to facilitate communication functions. In some embodiments, the wireless communication subsystem 2325 includes radio frequency receivers and transmitters, and optical receivers and transmitters (not shown in FIG. 23). These receivers and transmitters of some embodiments are implemented to operate over one or more communication networks such as a GSM network, a Wi-Fi network, a Bluetooth network, etc. The audio subsystem 2330 is coupled to a speaker to output audio (e.g., to output user-specific questions for generating the escrow key). Additionally, the audio subsystem 2330 is coupled to a microphone to facilitate voice-enabled functions, such as voice recognition (e.g., for searching), digital recording, etc.

The I/O subsystem 2335 involves the transfer between input/output peripheral devices, such as a display, a touch screen, etc., and the data bus of the processing units 2305 through the peripherals interface 2315. The I/O subsystem 2335 includes a touch-screen controller 2355 and other input controllers 2360 to facilitate the transfer between input/output peripheral devices and the data bus of the processing units 2305. As shown, the touch-screen controller 2355 is coupled to a touch screen 2365. The touch-screen controller 2355 detects contact and movement on the touch screen 2365 using any of multiple touch sensitivity technologies. The other input controllers 2360 are coupled to other input/control devices, such as one or more buttons. Some embodiments include a near-touch sensitive screen and a corresponding controller that can detect near-touch interactions instead of or in addition to touch interactions.

The memory interface 2310 is coupled to memory 2370. In some embodiments, the memory 2370 includes volatile memory (e.g., high-speed random access memory), non-volatile memory (e.g., flash memory), a combination of volatile and non-volatile memory, and/or any other type of memory. As illustrated in FIG. 23, the memory 2370 stores an operating system (OS) 2372. The OS 2372 includes instructions for handling basic system services and for performing hardware dependent tasks.

The memory 2370 also includes communication instructions 2374 to facilitate communicating with one or more additional devices; graphical user interface instructions 2376 to facilitate graphic user interface processing; image processing instructions 2378 to facilitate image-related processing and functions; input processing instructions 2380 to facilitate input-related (e.g., touch input) processes and functions; audio processing instructions 2382 to facilitate audio-related processes and functions; and camera instructions 2384 to facilitate camera-related processes and functions. The instructions described above are merely exemplary and the memory 2370 includes additional and/or other instructions in some embodiments. For instance, the memory for a smartphone may include phone instructions to facilitate phone-related processes and functions. Additionally, the memory may include instructions for a keychain backup or restoration application as well as other applications. The above-identified instructions need not be implemented as separate software programs or modules. Various functions of the mobile computing device can be implemented in hardware and/or in software, including in one or more signal processing and/or application specific integrated circuits.

While the components illustrated in FIG. 23 are shown as separate components, one of ordinary skill in the art will recognize that two or more components may be integrated into one or more integrated circuits. In addition, two or more components may be coupled together by one or more communication buses or signal lines. Also, while many of the functions have been described as being performed by one component, one of ordinary skill in the art will realize that the functions described with respect to FIG. 23 may be split into two or more integrated circuits.

B. Computer System

Figure 24:
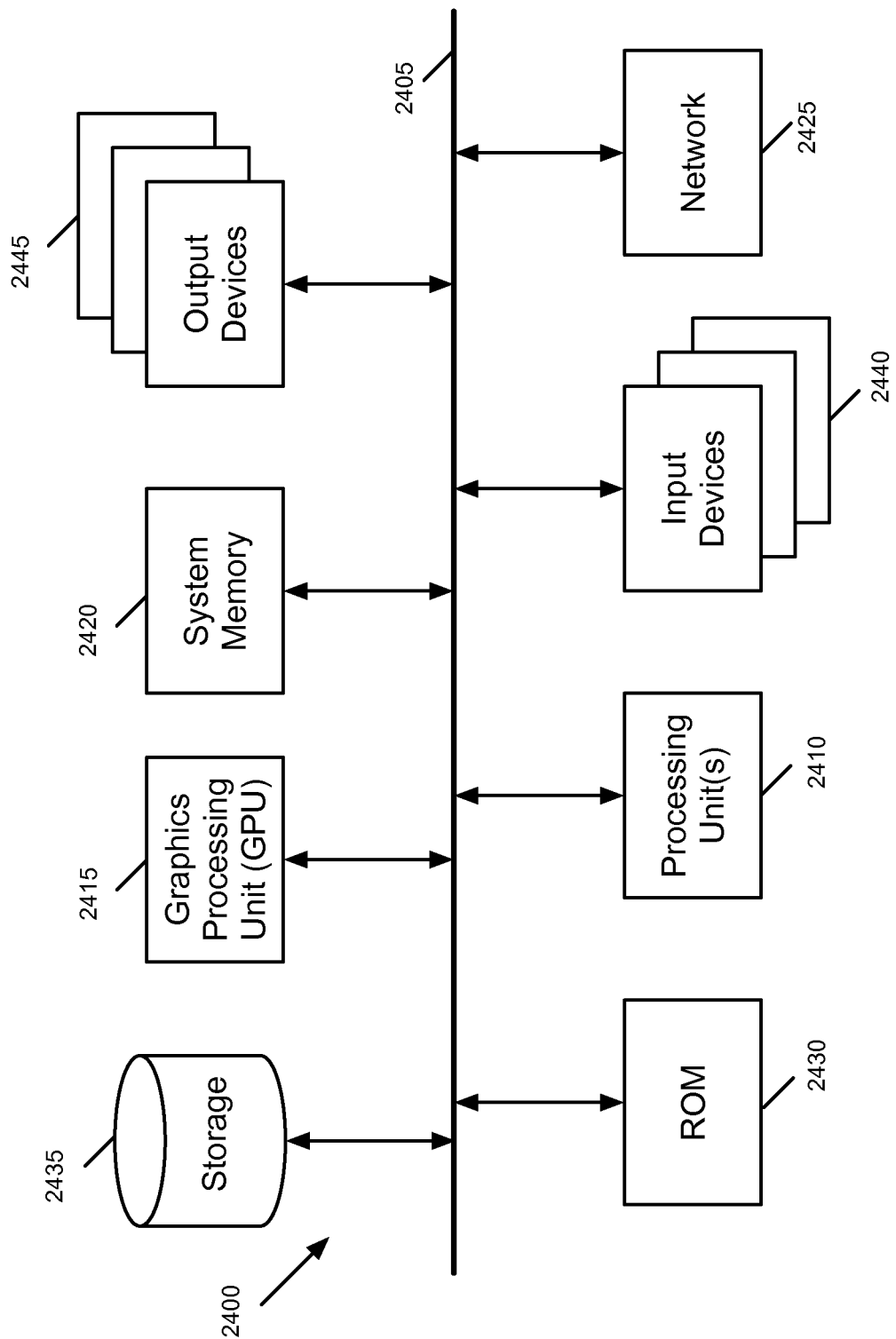
FIG. 24 conceptually illustrates an electronic system with which some embodiments of the invention are implemented.

FIG. 24 conceptually illustrates an electronic system 2400 with which some embodiments of the invention are implemented. The electronic system 2400 may be a computer (e.g., a desktop computer, personal computer, tablet computer, etc.), phone, PDA, or any other sort of electronic or computing device. Such an electronic system includes various types of computer readable media and interfaces for various other types of computer readable media. Electronic system 2400 includes a bus 2405, processing unit(s) 2410, a graphics processing unit (GPU) 2415, a system memory 2420, a network 2425, a read-only memory 2430, a permanent storage device 2435, input devices 2440, and output devices 2445.

The bus 2405 collectively represents all system, peripheral, and chipset buses that communicatively connect the numerous internal devices of the electronic system 2400. For instance, the bus 2405 communicatively connects the processing unit(s) 2410 with the read-only memory 2430, the GPU 2415, the system memory 2420, and the permanent storage device 2435.

From these various memory units, the processing unit(s) 2410 retrieves instructions to execute and data to process in order to execute the processes of the invention. The processing unit(s) may be a single processor or a multi-core processor in different embodiments. Some instructions are passed to and executed by the GPU 2415. The GPU 2415 can offload various computations or complement the image processing provided by the processing unit(s) 2410.

The read-only-memory (ROM) 2430 stores static data and instructions that are needed by the processing unit(s) 2410 and other modules of the electronic system. The permanent storage device 2435, on the other hand, is a read-and-write memory device. This device is a non-volatile memory unit that stores instructions and data even when the electronic system 2400 is off. Some embodiments of the invention use a mass-storage device (such as a magnetic or optical disk and its corresponding disk drive) as the permanent storage device 2435.

Other embodiments use a removable storage device (such as a floppy disk, flash memory device, etc., and its corresponding disk drive) as the permanent storage device. Like the permanent storage device 2435, the system memory 2420 is a read-and-write memory device. However, unlike storage device 2435, the system memory 2420 is a volatile read-and-write memory, such a random access memory. The system memory 2420 stores some of the instructions and data that the processor needs at runtime. In some embodiments, the invention's processes are stored in the system memory 2420, the permanent storage device 2435, and/or the read-only memory 2430. From these various memory units, the processing unit(s) 2410 retrieves instructions to execute and data to process in order to execute the processes of some embodiments.

The bus 2405 also connects to the input and output devices 2440 and 2445. The input devices 2440 enable the user to communicate information and select commands to the electronic system. The input devices 2440 include alphanumeric keyboards and pointing devices (also called "cursor control devices"), cameras (e.g., webcams), microphones or similar devices for receiving voice commands, etc. The output devices 2445 display images generated by the electronic system or otherwise output data. The output devices 2445 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 24, bus 2405 also couples electronic system 2400 to a network 2425 through a network adapter (not shown). In this manner, the computer can be a part of a network of computers (such as a local area network ("LAN"), a wide area network ("WAN"), or an Intranet, or a network of networks, such as the Internet. Any or all components of electronic system 2400 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter. While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. For instance, many of the exemplary figures relate to either a cellular device or a Wi-Fi enabled device. However, many of the illustrated operations could be performed interchangeably on a Wi-Fi enabled device or a cellular device. Furthermore a cellular device can also have Wi-Fi capability and perform the features described for Wi-Fi enabled devices. In addition, many of the figures illustrate various touch gestures (e.g., taps, double taps, swipe gestures, press and hold gestures, etc.). However, many of the illustrated operations could be performed via different touch gestures (e.g., a swipe instead of a tap, etc.) or by non-touch input (e.g., using a cursor controller, a keyboard, a touchpad/trackpad, a near-touch sensitive screen, etc.).

Moreover, a number of the figures, such as FIGS. 2, 4, 12, 13, 15, and 17, conceptually illustrate processes. The specific operations of these processes may not be performed in the exact order shown and described. The specific operations may not be performed in one continuous series of operations, and different specific operations may be performed in different embodiments. Likewise, the process could be implemented using several sub-processes, or as part of a larger macro process. Thus, one of ordinary skill in the art would understand that the invention is not to be limited by the foregoing illustrative details, but rather is to be defined by the appended claims.

What is claimed is:

1. A method comprising:
displaying, while a device is in a locked mode in which a plurality of services are unavailable on the device, a selectable user interface (UI) item on the device for enabling a person to operate the device to communicate with a privileged contact while the device is in the locked mode;
upon selection of the UI item, displaying a list of privileged contacts while the device is in the locked mode, wherein the list of privileged contacts includes an owner of the device;
displaying, upon selection of the privileged contact from the list of privileged contacts, a list of different communication types for initiating a communication with the privileged contact, the displayed list of different communication types being exclusive of communication types for initiating a communication with other privileged contacts; and
initiating the communication with the privileged contact selected from the list of privileged contacts, the communication having a communication type selected from the list of different communication types.

2. The method of claim 1, further comprising receiving the selection of the communication type from the list of different communication types before initiating the communication.

3. The method of claim 2, wherein the list of different communication types comprises a communication type provided by a third party application and the different communication types of the list of different communication types having been filtered based at least on a configuration of the device.

4. The method of claim 3, wherein the selected privileged contact is the owner of the device.

5. The method of claim 4, wherein the list of different communication types for the owner of the device comprises an e-mail communication type.

6. The method of claim 3, wherein the list of different communication types comprises different sets of communication types for different privileged contacts.

7. The method of claim 1, wherein the device is placed in the locked mode after a predetermined period of inactivity, the locked mode requiring the device to be unlocked before making said plurality of services available.

8. A non-transitory machine readable medium storing a program which when executed by at least one processing unit of a device bypasses a device security protection to communicate with a privileged contact, the program comprising sets of instructions for:
displaying, while the device is in a locked mode in which a plurality of services are unavailable on the device, a selectable user interface (UI) item on the device for enabling a person to operate the device to communicate with the privileged contact while the device is in the locked mode;
upon selection of the UI item, displaying a list of privileged contacts while the device is in the locked mode, wherein the list of privileged contacts includes an owner of the device;
upon selection of the privileged contact from the list of privileged contacts, determining a communication type of a plurality of different communication types for initiating a communication to the privileged contact based at least in part on a configuration of the device; and
initiating the communication with the privileged contact selected from the list of privileged contacts, the communication having the determined communication type.

9. The non-transitory machine readable medium of claim 8, wherein the program further comprises a set of instructions for receiving the selection of the privileged contact from the list of privileged contacts before initiating the communication.

10. The non-transitory machine readable medium of claim 9, wherein the program further comprises a set of instructions for displaying, upon receiving the selection of the privileged contact, a list of the plurality of different communication types.

11. The non-transitory machine readable medium of claim 10, wherein determining the communication type of the plurality of different communication types for initiating a communication to the privileged contact based at least in part on the configuration of the device further comprises determining the communication type of the plurality of different communication types based at least in part on the configuration of the device and a selection of one of the plurality of different communication types.

12. The non-transitory machine readable medium of claim 10, wherein the list of the plurality of different communication types comprises different sets of communication mechanisms for different privileged contacts.

13. The non-transitory machine readable medium of claim 8, wherein the list of privileged contacts comprises a set of automatically-generated privileged contacts.

14. A device comprising:
a memory; and
at least one processor configured to:
display while the device is in a locked mode in which a plurality of services are unavailable on the device, a selectable user interface (UI) item on the device for enabling a person to operate the device to communicate with a privileged contact while the device is in the locked mode;
upon selection of the UI item, display a list of privileged contacts while the device is in the locked mode, wherein the list of privileged contacts includes an owner of the device; and
initiate a communication with the privileged contact selected from the list of privileged contacts, the communication having a communication type selected from a plurality of different communication types determined based on a configuration of the device.

15. The device of claim 14, wherein the at least one processor is further configured to receive a selection of the privileged contact from the list of privileged contacts before initiating the communication.

16. The device of claim 15, wherein the at least one processor is further configured to display, upon receiving the selection of the privileged contact, a list of selectable communication mechanisms.

17. The device of claim 16, wherein the selected privileged contact is the owner of the device, wherein the list of selectable communication mechanisms for the owner of the device comprises at least one of e-mail and a phone call to a phone number not associated with the device.

18. The device of claim 16, wherein the list of selectable communication mechanisms includes different sets of communication mechanisms for different privileged contacts.

19. The device of claim 14, wherein the configuration of the device does not support cellular communications.

20. The device of claim 14, wherein the at least one processor is further configured to initiate the communication comprises a set of instructions for using a third-party application to initiate the communication.

* * * * *